United States Patent
Du

(10) Patent No.: US 11,240,798 B2
(45) Date of Patent: Feb. 1, 2022

(54) TRANSMISSION CONTROL METHOD AND APPARATUS

(71) Applicant: HUAWEI TECHNOLOGIES CO., LTD., Shenzhen (CN)

(72) Inventor: Zhenguo Du, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 50 days.

(21) Appl. No.: 16/629,001

(22) PCT Filed: Sep. 11, 2017

(86) PCT No.: PCT/CN2017/101310
§ 371 (c)(1),
(2) Date: Jan. 6, 2020

(87) PCT Pub. No.: WO2019/010808
PCT Pub. Date: Jan. 17, 2019

(65) Prior Publication Data
US 2020/0205140 A1    Jun. 25, 2020

(30) Foreign Application Priority Data
Jul. 12, 2017 (CN) .......................... 201710566562.6

(51) Int. Cl.
*H04W 72/04* (2009.01)
(52) U.S. Cl.
CPC ....... *H04W 72/044* (2013.01); *H04W 72/042* (2013.01)
(58) Field of Classification Search
CPC . H04W 72/04; H04W 72/044; H04W 72/042; H04L 5/0078; H04L 5/0053
See application file for complete search history.

(56) References Cited

U.S. PATENT DOCUMENTS

2016/0057753 A1    2/2016 Yang et al.
2016/0105863 A1*   4/2016 Li .................. H04W 72/042
                                                    370/330
(Continued)

FOREIGN PATENT DOCUMENTS

CN    105337706 A    2/2016
CN    106304380 A    1/2017
(Continued)

OTHER PUBLICATIONS

3GPP TR 38.912 V0.0.2 (Sep. 2016),3rd Generation Partnership Project;Technical Specification Group Radio Access Network;Study on New Radio Access Technology (Release 14),total 11 pages.

(Continued)

*Primary Examiner* — Maharishi V Khirodhar
*Assistant Examiner* — Kenneth P Hunt
(74) *Attorney, Agent, or Firm* — Hauptman Ham, LLP

(57) ABSTRACT

A transmission control method includes generating, by a first device, transmission control information, and sending the transmission control information to the second device. The transmission control information includes resource indication information, compression indication, and first indication. The resource indication information indicates a transmission resource allocated by the first device to a second device. The transmission resource includes at least two symbols. The compression indication indicates a numerology of a specific symbol in the transmission resource. The specific symbol includes at least an end symbol or a second symbol. The end symbol is the last symbol in the transmission resource. The second symbol is a symbol in the transmission resource and is used for transmitting only a demodulation reference signal or a long training field. The second symbol includes at least one symbol. The first (Continued)

indication indicates a numerology of a symbol in the transmission resource other than the specific symbol.

17 Claims, 13 Drawing Sheets

(56) References Cited

U.S. PATENT DOCUMENTS

| | | | |
|---|---|---|---|
| 2016/0285775 A1 | | 9/2016 | Damnjanovic et al. |
| 2017/0164349 A1 | | 6/2017 | Zhu et al. |
| 2018/0199341 A1 | | 7/2018 | Baldemair et al. |
| 2018/0302905 A1 | * | 10/2018 | Fodor ............... H04L 27/2646 |
| 2019/0109695 A1 | * | 4/2019 | Kim ................. H04L 27/2613 |
| 2020/0351044 A1 | * | 11/2020 | Hessler .............. H04L 5/0048 |

FOREIGN PATENT DOCUMENTS

| | | | | |
|---|---|---|---|---|
| CN | 106507486 A | | 3/2017 | |
| CN | 106717089 A | | 5/2017 | |
| CN | 106717089 B | * | 5/2017 | ............ H04W 72/04 |
| WO | 2017005295 A1 | | 1/2017 | |

OTHER PUBLICATIONS

R1-162156 Huawei, HiSilicon, "Scenario and design criteria on flexible numerologies",3GPP TSG RAN WG1 Meeting #84bis,Busan, Korea, Apr. 11-15, 2016,total 7 pages.

IEEE Std 802.11ac™-2013 Part 11: Wireless LAN Medium Access Control (MAC) and Physical Layer (PHY) Specifications Amendment 4: Enhancements for Very High Throughput for Operation in Bands below 6 GHz,IEEE Computer Society,total 425 pages.

IEEE P802.11ax™/D1.0 Draft Standard for Information technology— Telecommunications and information exchange between systems Local and metropolitan area networks—Specific requirements Part 11: Wireless LAN Medium Access Control □(MAC) and Physical Layer (PHY) Specifications-Amendment 6: Enhancements for High Efficiency WLAN,IEEE Computer Society,dated Nov. 2016,total 453 pages.

IEEE Std 802.11n™-2009 Part 11: Wireless LAN Medium Access Control (MAC) and Physical Layer (PHY) Specifications Amendment 5: Enhancements for Higher Throughput, IEEE Computer Society,dated Sep. 11, 2009,total 536 pages.

International search report dated Mar. 27, 2018 from corresponding application No. PCT/CN2017/101310.

R1-1612908 Ericsson,"Summary of e-mail discussions on downlink control signaling",TSG-RAN WG1 #87,Reno, NV, USA, Nov. 14-18, 2016,total 37 pages.

The extended European search report dated May 27, 2020 from corresponding application No. EP 17917413.1.

CMCC, "Multiple Numerologies Support in NR MAC", 3GPP TSG-RAN WGZ NR Ad Hoc, RZ-1700531, Spokane, USA, Jan. 17-19, 2017, total 2 pages.

LG Electronics Inc et al., "Support of different numerologies in New RAT", 3GPP TSG-RAN WG2 Meeting #96 Reno, USA, Nov. 14 - 18, 2016, R2-168374, total: 3 pages.

Chinese Notice of Allowance issued in corresponding Chinese Application No. 201780089642.5, dated Sep. 22, 2021, pp. 1-4.

* cited by examiner

 REs for data
 REs for DMRSs
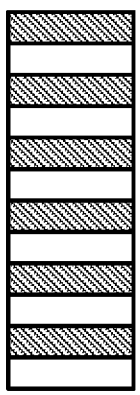 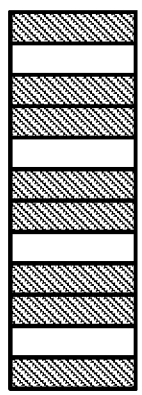  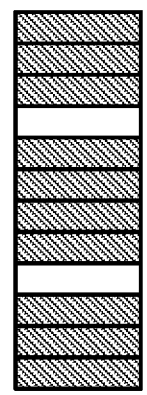 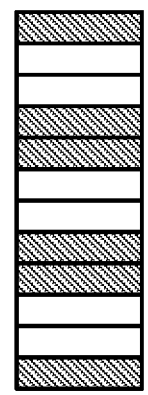
FIG. 6A    FIG. 6B    FIG. 6C    FIG. 6D    FIG. 6E

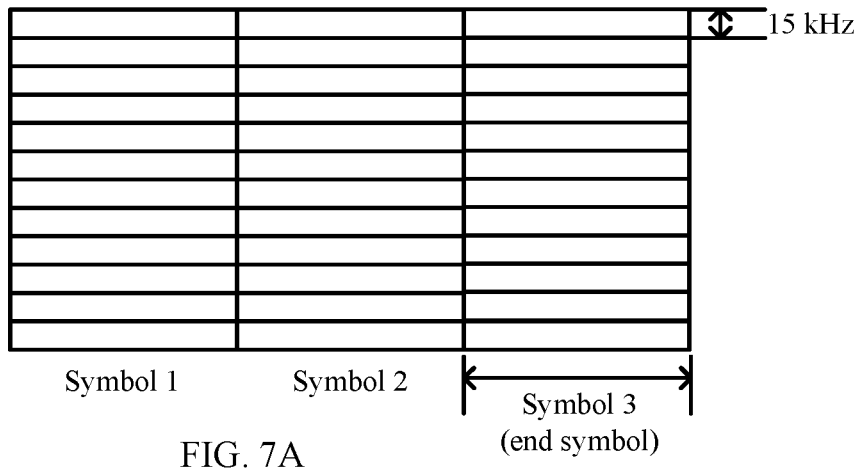
FIG. 7A
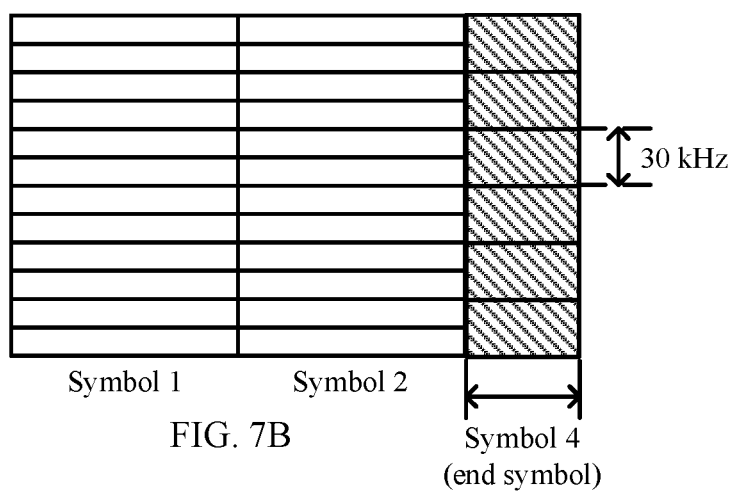
FIG. 7B
FIG. 7C

TRANSMISSION CONTROL METHOD AND APPARATUS

This application is a national stage of International Application No. PCT/CN2017/101310, filed on Sep. 11, 2017, which claims priority to Chinese Patent Application No. 201710566562.6, filed on Jul. 12, 2017.

TECHNICAL FIELD

This application relates to the field of communications technologies, and in particular, to a transmission control method and an apparatus.

BACKGROUND

In some approaches, an allocated physical layer transmission resource is required to be exactly padded fully with data transmitted from a media access control (MAC) layer to a physical layer. In some cellular communications systems, a resource block pair (RB pair) is used as a smallest transmission unit at a physical layer, and all RB pairs need to be fully padded with data transmitted from a MAC layer to a physical layer. Because a size of data that needs to be transmitted at an upper layer is indefinite, when an allocated transmission resource cannot be fully padded with to-be-transmitted data, a redundancy part needs to be added at an end of the to-be-transmitted data at the MAC layer.

In a fifth-generation (5-Generation, 5G) mobile communications new radio (new radio, NR) system based on orthogonal frequency division multiplexing (OFDM), on the one hand, a resource mini-slot (mini-slot) is used as a basic unit for resource scheduling, and a quantity of symbols that need to be padded is far greater than a quantity of symbols that need to be padded in the conventional communications system. This causes a more severe resource waste brought by padding at a MAC layer. On the other hand, ultra-reliable and low latency communications (URLLC) data transmission in NR needs to be completed in a time as short as possible. For a same data volume, shorter transmission duration results in higher frequency domain bandwidth that is required. Consequently, each OFDM symbol corresponds to more resource elements (REs). To ensure that all physical layer OFDM symbols are fully padded with MAC data, more redundant data needs to be used for padding.

Therefore, a transmission control method is urgently needed to resolve a problem that much redundant data is used for padding at a MAC layer during data transmission in an OFDM system including a 5G NR system.

SUMMARY

At least one embodiment of the present disclosure provides a transmission control method and an apparatus, to resolve a problem that much redundant data is used for padding at a MAC layer during data transmission in an OFDM system including a 5G NR system).

To achieve the foregoing objective, the following technical solutions are used in the embodiments of this application:

According to at least one embodiment, the present disclosure provides a transmission control method. In some embodiments, the method is applied to an orthogonal frequency division multiplexing OFDM system, and includes: generating, by a first device, transmission control information, where the transmission control information includes resource indication information, a compression indication, and a first indication, the resource indication information is used to indicate a transmission resource allocated by the first device to a second device, the transmission resource includes at least two symbols, the compression indication is used to indicate a numerology of one or more specific symbols in the transmission resource, the one or more specific symbols include an end symbol and/or a second symbol, the end symbol is the last symbol in the transmission resource, the second symbol is a symbol that is all used for transmitting a demodulation reference signal DMRS and that is in the transmission resource, the second symbol includes at least one symbol, and the first indication is used to indicate a numerology of a symbol in the transmission resource other than the one or more specific symbols; and sending, by the first device, the transmission control information to the second device. According to the transmission control method provided in at least one embodiment, the first device generates the transmission control information, and sends the transmission control information to the second device; and the second device may determine the allocated transmission resource based on the resource indication information, determine the numerology of the one or more specific symbols in the transmission resource based on the compression indication, and determine the numerology of the symbol other than the one or more specific symbols based on the first indication. The first device can flexibly and properly configure the transmission resource based on an actual requirement of a volume of to-be-transmitted data, and the first device and the second device transmit data by using the transmission resource. Compared with a transmission resource in which a same numerology is used for all symbols, this reduces redundant data used for padding at a MAC layer and/or shortens a length of a symbol for transmitting the DMRS, thereby reducing used transmission resources.

In some embodiments, the first device sends data to the second device on the transmission resource, or receives data from the second device on the transmission resource, where the numerology indicated by the compression indication is used for the one or more specific symbols in the transmission resource, and the numerology indicated by the first indication is used for the symbol in the transmission resource other than the one or more specific symbols. Based on the solution, the first device can send the data to the second device on the transmission resource allocated by the first device to the second device, or receive the data from the second device on the transmission resource. The numerology in the compression indication is used for the transmission resource. Therefore, transmitting the data on the transmission resource can reduce used transmission resources.

In some embodiments, the one or more specific symbols includes only the end symbol, and the compression indication is used to indicate a numerology of the end symbol.

In some embodiments, the one or more specific symbols includes only the second symbol, and the compression indication is used to indicate a numerology of the second symbol.

In some embodiments, the one or more specific symbols includes the end symbol and the second symbol, and the compression indication is used to indicate a numerology of the end symbol and a numerology of the second symbol.

In some embodiments, the numerology of the second symbol includes a subcarrier spacing corresponding to the second symbol, the subcarrier spacing corresponding to the second symbol is an integer multiple of a subcarrier spacing corresponding to a first symbol, and the first symbol is a symbol that does not belong to the one or more specific symbols in the transmission resource. Based on the solution, when the one or more specific symbols is the second symbol, it may be determined that the subcarrier spacing corresponding to the second symbol is the integer multiple of the subcarrier spacing corresponding to the first symbol, and the DMRS signal is transmitted based on the determined subcarrier spacing corresponding to the second symbol. In this way, a length of a symbol for transmitting the DMRS can be shortened in time domain, and transmission overheads are reduced.

In some embodiments, the numerology of the end symbol includes a subcarrier spacing corresponding to the end symbol, and the subcarrier spacing corresponding to the end symbol is an integer multiple of a subcarrier spacing corresponding to the first symbol.

In some embodiments, the subcarrier spacing corresponding to the end symbol is determined by the first device according to a formula U=L mod V, where U represent s a quantity of complex numbers mapped onto effective data used for padding the end symbol, L represents a total quantity of complex numbers mapped onto effective data, and V represents a quantity of subcarriers corresponding to the first symbol; and $$\begin{cases} N_2 = N_1 & \text{if } U = 0, \text{ or } \frac{V}{2} < U < V \\ N_2 \in \{N_1, 2N_1, 4N_1, \ldots, 2^n N_1\} & \text{if } \frac{V}{2^{n+1}} < U \le \frac{V}{2^n} \end{cases},$$

where $N_1$ represents the subcarrier spacing corresponding to the first symbol, $N_2$ represents the subcarrier spacing corresponding to the end symbol, and n is a positive integer. Based on the solution, the quantity of complex numbers mapped onto the effective data that may be used for padding the end symbol can be determined according to the foregoing formula, so that a quantity of redundant complex numbers that need to be used for padding the end symbol can be determined. According to the transmission control method provided in at least this embodiment of this application, when the quantity of redundant complex numbers that need to be used for padding the end symbol is greater than or equal to half a quantity of REs corresponding to the first symbol, the subcarrier spacing corresponding to the end symbol in the transmission resource may be determined based on the quantity of complex numbers mapped onto the effective data that may be used for padding the end symbol and the quantity of subcarriers corresponding to the first symbol.

In some embodiments, when the transmission resource includes a third symbol, the subcarrier spacing corresponding to the end symbol is determined by the first device according to a formula U=(L−Q)mod V, and the third symbol is a symbol used for hybrid transmission of effective data and a DMRS signal, where U represents a quantity of complex numbers mapped onto effective data used for padding the end symbol, L represents a total quantity of complex numbers mapped onto effective data, V represents a quantity of subcarriers corresponding to the first symbol, and Q represents a quantity of complex numbers mapped onto the effective data in all the third symbols; and $$\begin{cases} N_2 = N_1 & \text{if } U = 0, \text{ or } \frac{V}{2} < U < V \\ N_2 \in \{N_1, 2N_1, 4N_1, \ldots, 2^n N_1\} & \text{if } \frac{V}{2^{n+1}} < U \le \frac{V}{2^n} \end{cases},$$

where $N_1$ represents the subcarrier spacing corresponding to the first symbol, $N_2$ represents the subcarrier spacing corresponding to the end symbol, and n is a positive integer. Based on the solution, when the transmission resource includes the third symbol, the quantity of complex numbers mapped onto the effective data that may be used for padding the end symbol can be determined according to the foregoing formula, so that a quantity of redundant complex numbers that need to be used for padding the end symbol can be determined. When the quantity of redundant complex numbers that need to be used for padding the end symbol is greater than or equal to half a quantity of REs corresponding to the first symbol, it may be determined that the end symbol is the one or more specific symbols, and the subcarrier spacing corresponding to the end symbol in the transmission resource is determined based on the quantity of complex numbers mapped onto the effective data that may be used for padding the end symbol and the quantity of subcarriers corresponding to the first symbol, so as to compress the end symbol in time domain.

In some embodiments, the numerology of the one or more specific symbols includes a cyclic prefix CP length, the CP length $T_1$ of the one or more specific symbols is determined by the first device according to a formula $$T_1 = T \times \frac{N_1}{N_i},$$

T is a CP length of the first symbol, and $N_i$ is a subcarrier spacing corresponding to the one or more specific symbols. Based on the solution, the CP length of the one or more specific symbols can be determined according to the foregoing formula.

In some embodiments, the sending, by the first device, the transmission control information to the second device includes: adding, by the first device, the resource indication information, the compression indication, and the first indication to a same message or different messages, and sending the same message or the different messages to the second device. Based on the solution, the resource indication information, the compression indication, and the first indication are added to the same message or the different messages and then the same message or the different messages are sent to the second device, so that the first device can flexibly select a manner for notifying the second device.

In some embodiments, the first indication may be carried in downlink control information DCI, a media access control element MAC CE, a master information block MIB, a system information block SIB, a broadcast message, radio resource control RRC signaling, group common downlink control information group common DCI, or a physical header of a transmission frame. Based on the solution, the first indication may be carried in a message or signaling that is flexibly selected depending on an actual use scenario.

In some embodiments, when the one or more specific symbols includes only the end symbol, or the one or more specific symbols includes the end symbol and the second symbol, the compression indication is carried in DCI or a physical header of a transmission frame; or when the one or more specific symbols includes only the second symbol, the compression indication is carried in DCI, a MAC CE, a MIB, a SIB, RRC signaling, group common DCI, or a physical header of a transmission frame. Based on the solution, the compression indication may be carried in signaling or a message that is flexibly selected depending on an actual use scenario.

According to at least one embodiment, a transmission control method is provided. In some embodiments, the method is applied to an orthogonal frequency division multiplexing OFDM system, and includes: receiving, by a second device, transmission control information sent by a first device, where the transmission control information includes resource indication information, a compression indication, and a first indication, the resource indication information is used to indicate a transmission resource allocated by the first device to the second device, the transmission resource includes at least two symbols, the compression indication is used to indicate a numerology of a one or more specific symbols in the transmission resource, the one or more specific symbols includes an end symbol and/or a second symbol, the end symbol is the last symbol in the transmission resource, the second symbol is a symbol that is all used for transmitting a demodulation reference signal DMRS and that is in the transmission resource, the second symbol includes at least one symbol, and the first indication is used to indicate a numerology of a symbol in the transmission resource other than the one or more specific symbols; and determining, by the second device, the transmission resource based on the resource indication information, determining the numerology of the one or more specific symbols in the transmission resource based on the compression indication, and determining the numerology of the symbol in the transmission resource other than the one or more specific symbols based on the first indication. Based on the solution, the second device can determine the allocated transmission resource based on the resource indication information, determine the numerology of the one or more specific symbols in the transmission resource based on the compression indication, and determine the numerology of the symbol other than the one or more specific symbols based on the first indication. The first device can flexibly and properly configure the transmission resource indicated by the transmission control information, based on a volume of to-be-transmitted data, and the second device transmits data by using the transmission resource. Compared with a transmission resource in which a same numerology is used for all symbols, this can reduce redundant data used for padding the end symbol and/or shorten duration for transmitting the DMRS in the transmission resource, thereby reducing used transmission resources.

In some embodiments, the second device sends data to the first device on the transmission resource, or receives data from the first device on the transmission resource, where the numerology indicated by the compression indication is used for the one or more specific symbols in the transmission resource, and the numerology indicated by the first indication is used for the symbol in the transmission resource other than the one or more specific symbols. Based on the solution, the second device can send the data to the first device on the transmission resource allocated by the first device to the second device, or receive the data from the first device on the transmission resource. The numerology in the compression indication is used for the transmission resource. Therefore, transmitting the data on the transmission resource can reduce used transmission resources.

In some embodiments, the receiving, by a second device, transmission control information sent by a first device includes: receiving, by the second device from the first device, a same message or different messages carrying the resource indication information, the compression indication, and the first indication. Based on the solution, the second device can receive the same message or the different messages carrying the resource indication information, the compression indication, and the first indication, so that the second device can flexibly receive the transmission control information sent by the first device.

In some embodiments, the one or more specific symbols includes only the end symbol, and the compression indication is used to indicate a numerology of the end symbol.

In some embodiments, the one or more specific symbols includes only the second symbol, and the compression indication is used to indicate a numerology of the second symbol.

In some embodiments, the one or more specific symbols includes the end symbol and the second symbol, and the compression indication is used to indicate a numerology of the end symbol and a numerology of the second symbol.

In some embodiments, the numerology of the second symbol includes a subcarrier spacing corresponding to the second symbol, the subcarrier spacing corresponding to the second symbol is an integer multiple of a subcarrier spacing corresponding to a first symbol, and the first symbol is a symbol that does not belong to the one or more specific symbols in the transmission resource.

In some embodiments, the numerology of the end symbol includes a subcarrier spacing corresponding to the end symbol, and the subcarrier spacing corresponding to the end symbol is an integer multiple of a subcarrier spacing corresponding to a first symbol.

In some embodiments, the receiving, by a second device, transmission control information sent by a first device includes: receiving, by the second device from the first device, a same message or different messages carrying the resource indication information, the compression indication, and the first indication. Based on the solution, the second device can receive the resource indication information, the compression indication, and the first indication from the same message or the different messages.

In some embodiments, the first indication may be carried in downlink control information DCI, a media access control element MAC CE, a master information block MIB, a system information block SIB, a broadcast message, radio resource control RRC signaling, group common downlink control information group common DCI, or a physical header of a transmission frame. Based on the solution, the first indication received by the second device may be carried in a message or signaling that is flexibly selected by the first device depending on an actual use scenario.

In some embodiments, when the one or more specific symbols includes only the end symbol, or the one or more specific symbols includes the end symbol and the second symbol, the compression indication is carried in DCI or a physical header of a transmission frame; or when the one or more specific symbols includes only the second symbol, the compression indication is carried in DCI, a MAC CE, a MIB, a SIB, RRC signaling, group common DCI, or a physical header of a transmission frame. Based on the solution, the second device can obtain the compression indication from different signaling or messages.

According to at least one embodiment, of the present disclosure provides a frame format of a transmission frame. In some embodiments, a physical header of the format of the transmission frame is used to carry a compression indication and/or a first indication.

According to at least one embodiment of the present disclosure provides a first device. In some embodiments, the first device has a function of implementing terminal behavior in the foregoing method. In some embodiments, the function may be implemented by using hardware, or may be implemented by hardware executing corresponding software. The hardware or the software includes one or more modules corresponding to the function.

According to at least one embodiment, the present disclosure includes a second device. In some embodiments, the second device has a function of implementing terminal behavior in the foregoing method. In some embodiments, the function may be implemented by using hardware, or may be implemented by hardware executing corresponding software. The hardware or the software includes one or more modules corresponding to the function.

According to at least one embodiment, at least an embodiment provides a first device, including a processor, a memory, and a communications interface. In some embodiments, the memory is configured to store a computer executable instruction. When the first device runs, the processor executes the computer executable instruction stored in the memory, so that the first device performs the transmission control method according to each of the foregoing aspects.

According to at least one embodiment, the present disclosure includes a second device, including a processor, a memory, and a communications interface. In some embodiments, the memory is configured to store a computer executable instruction. When the second device runs, the processor executes the computer executable instruction stored in the memory, so that the second device performs the transmission control method according to each of the foregoing aspects.

According to at least one embodiment, the present disclosure includes a computer readable storage medium. In some embodiments, the computer readable storage medium stores an instruction. When the instruction runs on a computer, the computer is enabled to perform the transmission control method according to each of the foregoing aspects.

According to at least one embodiment, the present disclosure includes a computer program product including an instruction. When the computer program product is executed on a computer, the computer is enabled to perform the transmission control method according to each of the foregoing aspects.

In addition, for at least one or more technical effects achieved in any one of the embodiments of the present disclosure, refer to the technical effects achieved in the at least one embodiments. Details are not described herein again for brevity.

These aspects or other aspects of this application are described in the following embodiments.

BRIEF DESCRIPTION OF DRAWINGS

FIG. 6A, FIG. 6B, FIG. 6C, FIG. 6D and FIG. 6E are a schematic diagram of a third symbol according to at least an embodiment of this application;

FIG. 7A, FIG. 7B and FIG. 7C are a schematic diagram for compressing a specific symbol according to at least an embodiment of this application;

DETAILED DESCRIPTION

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

1. Resource Block Pair (RB Pair)

Figure 1:
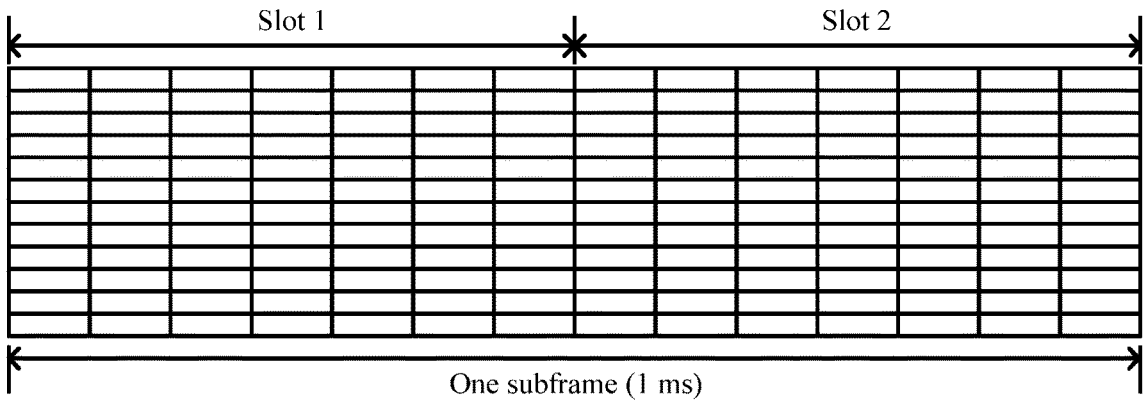
FIG. 1 is a schematic structural diagram of an RB pair according to at least an embodiment of this application.

In some cellular communications systems, an RB pair is used as a smallest unit for resource scheduling at a physical layer. Each RB pair includes two RBs. Each RB includes 12 subcarriers in frequency domain, and a subcarrier spacing (Subcarrier Spacing, SCS) between adjacent subcarriers is 15 kHz. Each RB includes one slot (slot) in time domain. When a cyclic prefix (cyclic prefix, CP) of a symbol is a normal cyclic prefix (normal CP, NCP), each slot includes six symbols. When the CP of the symbol is an extended cyclic prefix (extended CP, ECP), each slot includes seven symbols. For example, FIG. 1 is a schematic structural diagram of an RB pair according to an embodiment of this application. As shown in FIG. 1, when a CP is an NCP, one RB pair includes seven symbols in time domain, and the seven symbols are equal to a length of one subframe in effect, that is, 1 ms. Each small rectangular box represents one resource element (resource element, RE). One resource element represents one symbol in time domain, and represents a frequency domain resource corresponding to one subcarrier in frequency domain.

It should be noted that a symbol in at least this embodiment of this application is an OFDM symbol. Other symbols are within the scope of the present disclosure.

2. Mini-Slot (Mini-Slot)

In a 5G NR system, a mini-slot is used as a smallest unit for resource scheduling at a physical layer. In time domain, the mini-slot may include a variable quantity of symbols, and may include a minimum of one symbol. NR can support a plurality of subcarrier spacings in frequency domain, for example, SCS=15 kHz×$2^n$, where n is a positive integer, while an LTE system supports only a subcarrier spacing of 15 kHz.

Figure 3:
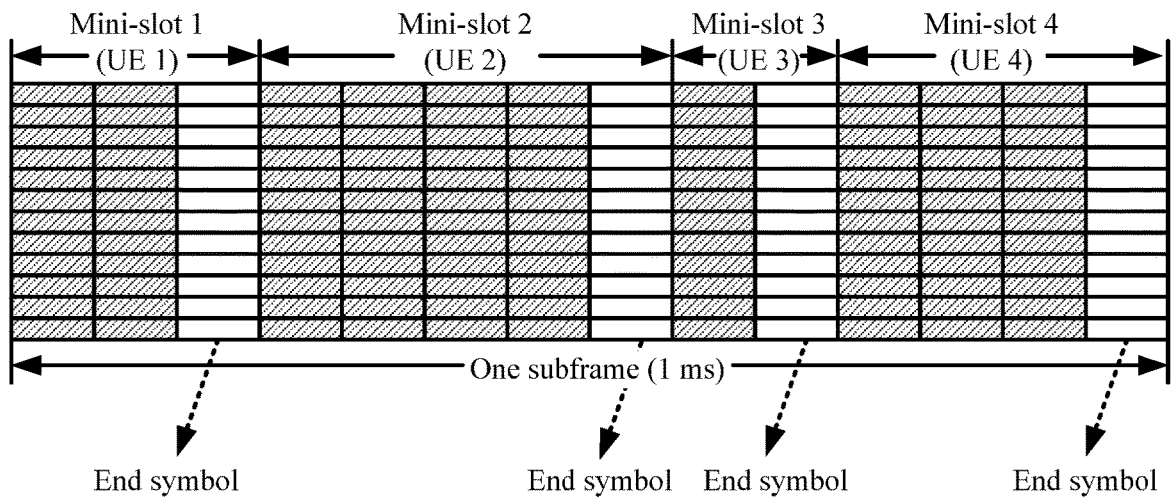
FIG. 3 is a schematic structural diagram of a mini-slot according to at least an embodiment of this application.

FIG. 3 is a schematic structural diagram of a mini-slot according to an embodiment of this application. One subframe in NR includes four mini-slots. A mini-slot 1 includes three symbols, a mini-slot 2 includes five symbols, a mini-slot 3 includes two symbols, and a mini-slot 4 includes four symbols. The mini-slot 1 is used by UE 1 to transmit data, the mini-slot 2 is used by UE 2 to transmit data, the mini-slot 3 is used by UE 3 to transmit data, and the mini-slot 4 is used by UE 4 to transmit data.

3. MAC Layer Frame Structure

Figure 2:
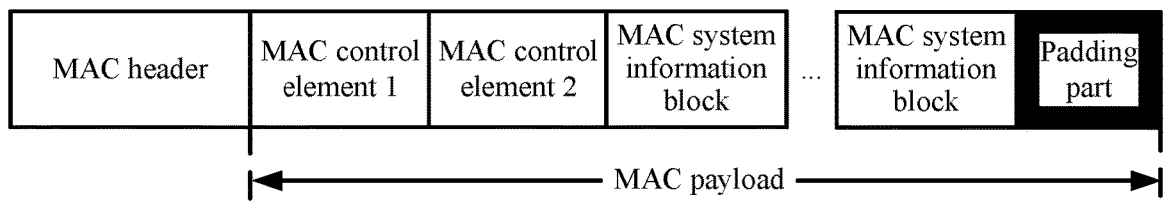
FIG. 2 is a schematic diagram of a MAC layer frame structure according to at least an embodiment of this application.

FIG. 2 is a schematic diagram of a MAC layer frame structure according to an embodiment of this application. As shown in FIG. 2, the MAC layer frame structure includes a MAC header, a MAC control element 1, a MAC control element 2, at least one MAC information block, and a padding part. The padding part is optional. When an allocated physical layer transmission resource is exactly padded fully with MAC layer data, no padding is required; in other words, there is no padding part. When the allocated transmission resource cannot be fully padded with the MAC layer data, redundant data is added to the padding part in the MAC layer frame structure shown in FIG. 3, so that the allocated transmission resource is exactly padded fully with the MAC layer data.

4. Demodulation Reference Signal (DMRS)

A DMRS is used for channel estimation. During uplink transmission in an LTE system, a DMRS occupies an independent symbol in time domain, and occupies all REs corresponding to the symbol in frequency domain. After receiving the DMRS, a device can estimate a channel state of a subcarrier in a transmission resource.

The following describes the technical solutions in the embodiments of this application with reference to the accompanying drawings in the embodiments of this application.

It should be noted that "/" in the embodiments of this application represents a meaning of "or". For example, A/B may represent A or B, and "and/or" in the embodiments of this application describes only an association relationship for describing associated objects and represents that three relationships may exist. For example, A and/or B may represent the following three cases: Only A exists, both A and B exist, and only B exists. "A plurality of" means "two or more".

It should be noted that in the embodiments of this application, the term such as "example" or "for example" is used to represent giving an example, an illustration, or a description. Any embodiment or design scheme described as an "example" or "for example" in the embodiments of this application should not be interpreted as being preferred or having advantages over another embodiment or design scheme. Exactly, use of the term such as "example" or "for example" is intended to present a related concept in a specific manner.

It should be noted that in the embodiments of this application, "of (of)", "corresponding (corresponding, relevant)", and "corresponding (corresponding)" are interchangeable sometimes. It should be noted that, when differences between the terms are not emphasized, meanings of the terms are the same.

It should be noted that in the embodiments of this application, a first device is a device having a center control function, and a second device is a device that is capable of receiving scheduling information and indication information of the first device. The first device allocates a transmission resource to the second device, and the first device and the second device transmit data by using the allocated transmission resource. The first device may be a macro base station, a micro base station, a pico base station (pico), a femto base station (femto), a transmission point (TP), a relay (relay), an access point (access point, AP), or the like. For example, the second device may be a device such as a mobile phone, a computer, a smart band, a smartwatch, a data card, a sensor, or a station (station, STA). For a sidelink (sidelink), that is, for device-to-device (D2D), a device having a center control function is the first device, and a device that is capable of receiving scheduling information and indication information of the first device is the second device. For example, for smart band-mobile phone-base station links, in a link between the mobile phone and the base station, the base station is the first device, and the mobile phone is the second device; and in a link between the mobile phone and the smart band, the mobile phone is the first device, and the smart band is the second device.

Figure 4:
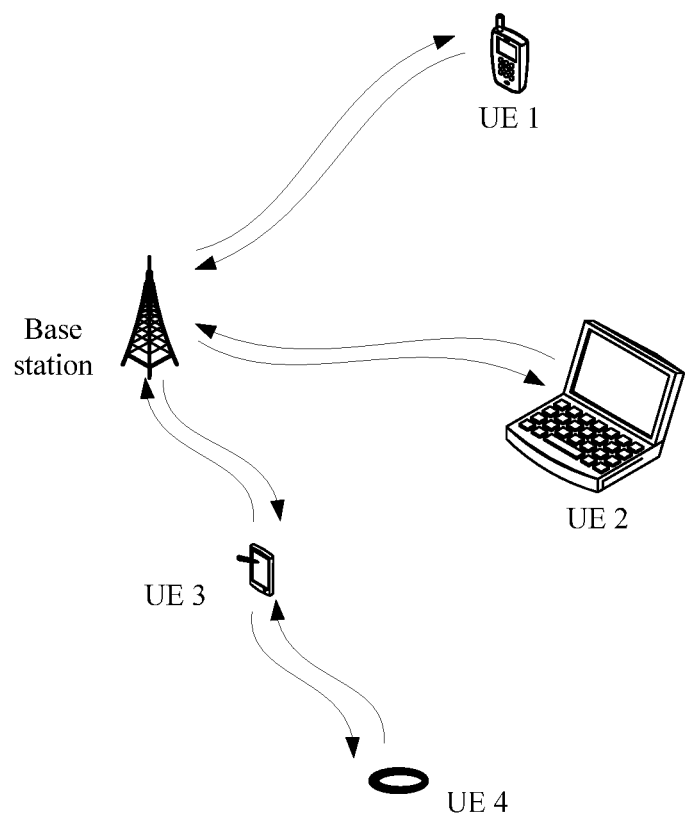
FIG. 4 is an architectural diagram of a transmission control system according to at least an embodiment of this application.

FIG. 4 is an architectural diagram of a transmission control system according to an embodiment of this application. The transmission control system includes a base station, UE 1, UE 2, UE 3, and UE 4. In links between the base station and the UE 1, between the base station and the UE 2, and between the base station and the UE 3, the base station is a first device, and the UE 1, the UE 2, and the UE 3 are second devices. In a link between the UE 3 and the UE 4, the UE 3 is a first device, and the UE 4 is a second device.

The following specifically describes, with reference to FIG. 4, a transmission control method provided in the embodiments of this application.

Figure 5:
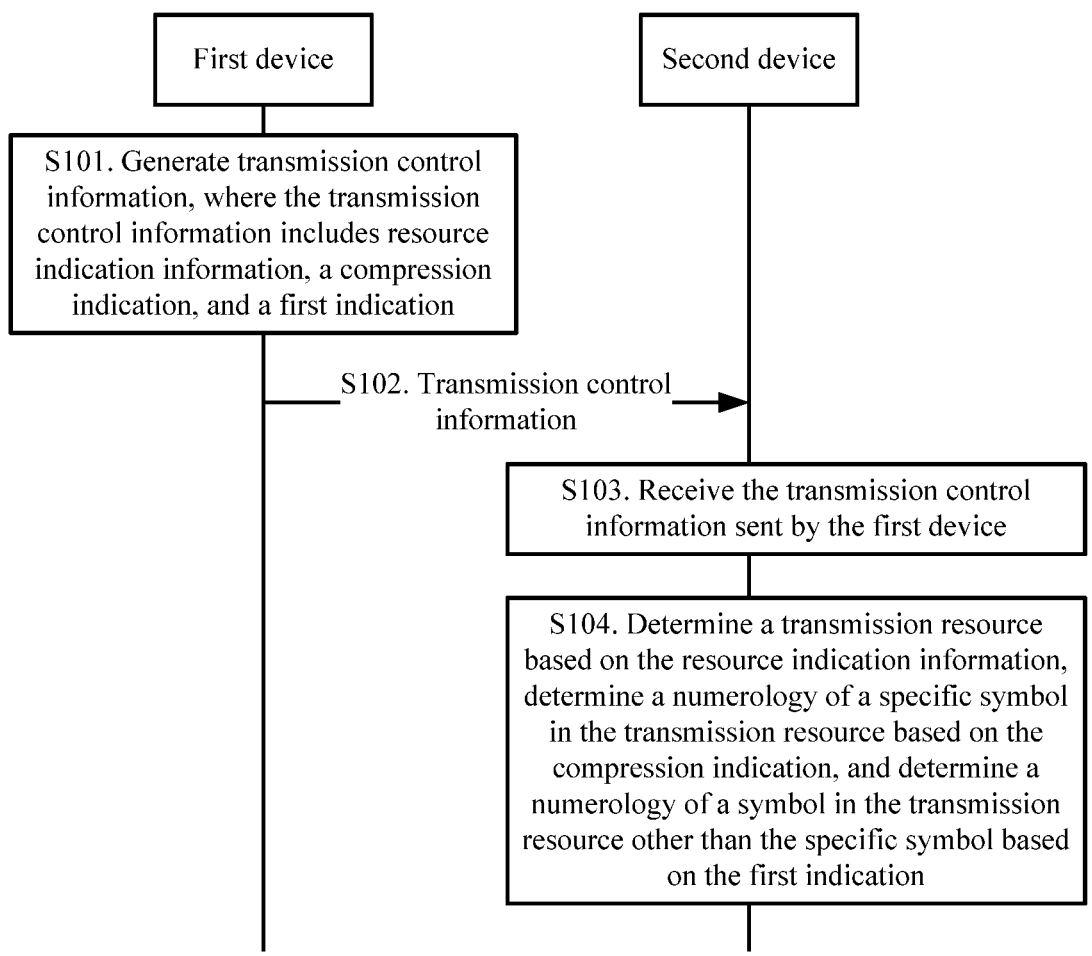
FIG. 5 is a schematic interactive diagram of a transmission control method according to at least an embodiment of this application.

FIG. 5 is a schematic interactive diagram of a transmission control method according to an embodiment of this application. The method includes steps S101 to S104.

S101. A first device generates transmission control information, where the transmission control information includes resource indication information, a compression indication, and a first indication.

The resource indication information is used to indicate a transmission resource allocated by the first device to a second device, the transmission resource includes at least two symbols, the compression indication is used to indicate a numerology of a one or more specific symbols in the transmission resource, the one or more specific symbols includes an end symbol and/or a second symbol, the end symbol is the last symbol in the transmission resource, the second symbol is a symbol that is used for transmitting only a demodulation reference signal and that is in the transmission resource, the second symbol includes at least one symbol, and the first indication is used to indicate a numerology of a symbol in the transmission resource other than the one or more specific symbols.

For example, the end symbol in at least this embodiment of this application may be the last symbol in a mini-slot. For example, in FIG. 3, the third symbol that is allocated to the UE 1 and that is in the mini-slot 1, the fifth symbol that is allocated to the UE 2 and that is in the mini-slot 2, the second symbol that is allocated to the UE 3 and that is in the mini-slot 3, or the fourth symbol that is allocated to the UE 4 and that is in the mini-slot 4 is the end symbol.

S102. The first device sends the transmission control information to the second device.

S103. The second device receives the transmission control information sent by the first device.

S104. The second device determines the transmission resource based on the resource indication information, determines the numerology of the one or more specific symbols in the transmission resource based on the compression indication, and determines the numerology of the symbol in the transmission resource other than the one or more specific symbols based on the first indication.

The first device generates the transmission control information, and sends the transmission control information to the second device. The second device may determine the allocated transmission resource based on the resource indication information, determine the numerology of the one or more specific symbols in the transmission resource based on the compression indication, and determine the numerology of the symbol other than the one or more specific symbols based on the first indication. The first device can flexibly and properly configure the transmission resource based on an actual requirement of a volume of to-be-transmitted data, and the first device and the second device transmit data by using the transmission resource. Compared with a transmission resource in which a same numerology is used for all symbols, this reduces redundant data used for padding at a MAC layer and/or shortens a length of a symbol for transmitting the DMRS, thereby reducing used transmission resources.

Specifically, the generating, by a first device, transmission control information may specifically include steps S101A and S101B.

S101A. The first device determines the numerology carried in the first indication.

The numerology in the first indication includes a subcarrier spacing corresponding to a first symbol and/or a CP length of the first symbol. The first symbol is a symbol that does not belong to the one or more specific symbols in the transmission resource, the first symbol includes at least one symbol, and all symbols in the first symbol are corresponding to a same numerology.

It should be noted that in at least this embodiment of this application, a numerology of the first symbol is a reference numerology for determining the numerology of the one or more specific symbols in the transmission resource. The numerology of the first symbol is unrelated to the data volume of the to-be-transmitted data. All symbols in a first symbol in one transmission resource are corresponding to a same numerology, and first symbols in different transmission resources may be corresponding to a same numerology or different numerologies. This is not specifically limited to this embodiment of this application.

The allocated transmission resource usually includes a quantity of symbols allocated in time domain and a quantity of RBs allocated in frequency domain. An RB indicates a quantity of REs (or indicates a quantity of subcarriers). Each RE corresponding to a symbol includes an effective data part and a CP part, and a different carrier spacing causes a change in duration of the effective data part. Two devices that transmit data by using the transmission resource determine, based on the numerology carried in the first indication, a CP length of an RE corresponding to each symbol and a subcarrier spacing corresponding to each symbol in the transmission resource, to determine a padding manner used for the symbol during data sending, or to determine, based on the CP length of the RE corresponding to each symbol and the subcarrier spacing corresponding to each symbol in the transmission resource, how to demodulate received data.

When a CP type is determined, and the duration of the effective data part and duration of the CP part change proportionally in time domain, the CP length, the subcarrier spacing, and the numerology have a one-to-one correspondence. In this case, the CP length may be determined based on the subcarrier spacing, or the subcarrier spacing may be determined based on the CP length. For example, the first indication may carry only the CP length of the first symbol or carry only the subcarrier spacing corresponding to the first symbol. Certainly, the first indication may alternatively carry both a CP length indication of the first symbol and a subcarrier spacing indication of the first symbol.

In some embodiments, the first device may configure correspondences between different bandwidth parts (BWPs) and different numerologies. The BWP is also referred to as a subband. Before the first device and the second device transmit data, the first device may determine a target correspondence based on a BWP used by the first device and the second device, and send the target correspondence to the second device. In at least this embodiment of this application, the numerology, indicated by the first indication, of the first symbol may be determined by the first device in the foregoing manner. The first device may determine, based on factors such as a moving speed of the second device and/or a latency requirement of a current service of the second device, a specific BWP including a used transmission resource. This means that a numerology bound to the transmission resource is the numerology of the first symbol. For example, for a second device that moves at a high speed and/or is latency-insensitive to a service, a transmission resource in a BWP with a relatively long CP length and a relatively small SCS may be configured. For a second device that moves at a low speed and/or is latency-sensitive to a service, a transmission resource in a BWP with a relatively short CP length and a relatively large SCS may be configured.

S101B. The first device determines the numerology of the one or more specific symbols based on the numerology of the first symbol, to obtain the compression indication.

Specifically, the first device may determine the compression indication based on the data volume of the to-be-transmitted data and a quantity of REs corresponding to the first symbol in the transmission resource in frequency domain.

In some embodiments, when the one or more specific symbols includes only the end symbol, the compression indication is used to indicate a numerology of the end symbol. When the one or more specific symbols includes only the second symbol, the compression indication is used to indicate a numerology of the second symbol. When the one or more specific symbols includes the end symbol and the second symbol, the compression indication is used to indicate a numerology of the end symbol and a numerology of the second symbol.

In at least this embodiment of this application, the compression indication can flexibly carry different numerologies based on different one or more specific symbols.

In some embodiments, the compression indication may directly carry a subcarrier spacing corresponding to the one or more specific symbols and/or a CP length of the one or more specific symbols, for example, carry a subcarrier spacing of 30 kHz corresponding to the end symbol; or may carry a compression indication value of the one or more specific symbols. When the compression indication carries a compression indication value, the first device and the second device each store a correspondence between a compression indication value and a numerology of a one or more specific symbols. For example, assuming that the carried compression indication value is 0, it indicates that the one or more specific symbols is not compressed. To be specific, the numerology of the one or more specific symbols is the same as that of the first symbol. For example, SCS=15 kHz. Assuming that the compression indication value is 1, it indicates that a data part of the one or more specific symbols is compressed to half a length of the first symbol. To be specific, the SCS of the one or more specific symbols is double the SCS of the first symbol. For example, SCS=30 kHz. A form carried in the compression indication is not specifically limited to this embodiment of this application.

The following briefly describes how the first device determines the subcarrier spacing corresponding to the one or more specific symbols and determines the CP length of the one or more specific symbols.

1. The first device determines the subcarrier spacing corresponding to the one or more specific symbols.

A. The first device determines a subcarrier spacing corresponding to the second symbol.

The first device determines the numerology of the second symbol based on channel flatness. When the numerology of the second symbol includes the subcarrier spacing corresponding to the second symbol, the subcarrier spacing corresponding to the second symbol is an integer multiple of the subcarrier spacing corresponding to the first symbol.

For example, if the subcarrier spacing corresponding to the first symbol is $N_1$, the subcarrier spacing corresponding to the second symbol may be selected as $2^n N_1$, where n is a positive integer.

It should be noted that a flatter channel in frequency domain indicates a larger value that may be configured for n and a larger subcarrier spacing. In this case, if duration of a symbol is shorter, more transmission overheads are reduced.

For example, if the subcarrier spacing corresponding to the first symbol is $N_1=15$ kHz$\times 2^M$, and when the transmission control method provided in at least this embodiment of this application is used, the subcarrier spacing corresponding to the second symbol may be 15 kHz$\times 2^{M+n}$. Assuming that a time domain length of each symbol in the first symbol is T, a time domain length of each symbol in the second symbol is reduced to $$\frac{T}{2^n}.$$

In comparison with a transmission resource in which a same numerology is used for all symbols, transmission duration of c each second symbol can be reduced by $$T - \frac{T}{2^n}$$

by using the transmission control method provided in at least this embodiment of this application.

According to the transmission control method provided in at least this embodiment of this application, when the one or more specific symbols is the second symbol, it may be determined that the subcarrier spacing corresponding to the second symbol is the integer multiple of the subcarrier spacing corresponding to the first symbol, and the DMRS signal is transmitted based on the determined subcarrier spacing corresponding to the second symbol. In this way, a length of a symbol for transmitting the DMRS can be shortened in time domain, and transmission overheads are reduced.

B. The first device determines the subcarrier spacing corresponding to the end symbol.

The numerology of the end symbol includes the subcarrier spacing corresponding to the end symbol, and the subcarrier spacing corresponding to the end symbol is an integer multiple of the subcarrier spacing corresponding to the first symbol.

(1) The subcarrier spacing corresponding to the end symbol is determined by the first device according to a formula U=L mod V.

U represents a quantity of complex numbers mapped onto effective data used for padding the end symbol, L represents a total quantity of complex numbers mapped onto effective data, and V represents a quantity of subcarriers corresponding to the first symbol; and $$\begin{cases} N_2 = N_1 & \text{if } U = 0, \text{ or } \frac{V}{2} < U < V \\ N_2 \in \{N_1, 2N_1, 4N_1, \ldots, 2^n N_1\} & \text{if } \frac{V}{2^{n+1}} < U \leq \frac{V}{2^n} \end{cases},$$

where $N_1$ represents the subcarrier spacing corresponding to the first symbol, $N_2$ represents the subcarrier spacing corresponding to the end symbol, and n is a positive integer.

First, the first device determines, according to the formula (1), the quantity of complex numbers mapped onto the effective data carried in the end symbol:

$$U=L \bmod V \qquad (1)$$

Then, after determining the quantity of complex numbers mapped onto the effective data carried in the end symbol, the first device determines, according to the formula (2), the subcarrier spacing corresponding to the end symbol:

$$\begin{cases} N_2 = N_1 & \text{if } U = 0, \text{ or } \frac{V}{2} < U < V \\ N_2 \in \{N_1, 2N_1, 4N_1, \ldots, 2^n N_1\} & \text{if } \frac{V}{2^{n+1}} < U \leq \frac{V}{2^n} \end{cases} \qquad (2)$$

It should be noted that, when a value of U is 0, it indicates that all symbols with a subcarrier spacing $N_1$ are exactly padded fully with to-be-transmitted effective data. In other words, no redundant data needs to be added to the end symbol, and the subcarrier spacing corresponding to the end symbol is equal to the subcarrier spacing corresponding to the first symbol, that is, the end symbol does not need to be compressed. In case of $$\frac{V}{2} < U < V,$$

it indicates that to-be-transmitted data that may be used for padding the end symbol exceeds half a quantity of REs corresponding to the end symbol. In this case, if the end symbol is compressed, the to-be-transmitted data cannot be entirely transmitted, and therefore the end symbol cannot be compressed. In other words, the subcarrier spacing corresponding to the end symbol is equal to the subcarrier spacing corresponding to the first symbol. In case of $$\frac{V}{2^{n+1}} < U \le \frac{V}{2^n},$$

it indicates that to-be-transmitted data that may be used for padding the end symbol does not exceed $$\frac{V}{2^n}$$

of a quantity of REs corresponding to the end symbol. In this case, the end symbol can be compressed, and the subcarrier spacing corresponding to the end symbol may be selected from $N_1, 2N_1, 4N_1, \ldots, 2^n N_1$. If a larger subcarrier spacing is selected, duration of the end symbol after the compression is shorter, and more transmission overheads are reduced. Therefore, in consideration of minimization of the transmission overheads, in case of $N_2 = 2^n N_1$, maximum transmission overheads are reduced.

The first device may usually determine, based on the data volume of the to-be-transmitted data, the total quantity of complex numbers mapped onto the effective data. The to-be-transmitted data may be data sent by the first device to the second device, or may be data received by the first device from the second device. Before the first device receives the to-be-transmitted data sent by the second data, the second device sends the data volume of the to-be-transmitted data to the first device, so that the first device allocates the transmission resource to the second device based on the data volume of the to-be-transmitted data. How the first device obtains the data volume of the to-be-transmitted data is not specifically limited to this embodiment of this application.

The quantity of complex numbers mapped onto the effective data used for padding the end symbol can be determined according to the formula (1), so that a quantity of redundant complex numbers that need to be used for padding the end symbol can be determined. According to the transmission control method provided in at least this embodiment of this application, when the quantity of redundant complex numbers that need to be used for padding the end symbol is greater than or equal to half the quantity of REs corresponding to the first symbol, the subcarrier spacing corresponding to the end symbol in the transmission resource may be determined based on the quantity of complex numbers mapped onto the effective data used for padding the end symbol and the quantity of subcarriers corresponding to the first symbol.

(2) When the transmission resource includes a third symbol, the subcarrier spacing corresponding to the end symbol is determined by the first device according to a formula U=(L−Q)mod V, and the third symbol is a symbol used for hybrid transmission of effective data and a DMRS signal.

U represents a quantity of complex numbers mapped onto effective data used for padding the end symbol, L represents a total quantity of complex numbers mapped onto effective data, V represents a quantity of subcarriers corresponding to the first symbol, and Q represents a quantity of complex numbers mapped onto effective data in all third symbols; and $$\begin{cases} N_2 = N_1 & \text{if } U = 0, \text{ or } \frac{V}{2} < U < V \\ N_2 \in \{N_1, 2N_1, 4N_1, \ldots, 2^n N_1\} & \text{if } \frac{V}{2^{n+1}} < U \le \frac{V}{2^n} \end{cases},$$

where $N_1$ represents the subcarrier spacing corresponding to the first symbol, $N_2$ represents the subcarrier spacing corresponding to the end symbol, and n is a positive integer.

It should be noted that hybrid transmission of effective data and a DMRS signal means that some REs corresponding to the symbol carry the effective data and some REs corresponding to the symbol carry the DMRS signal.

First, the first device determines, according to the formula (3), an equivalent quantity of complex numbers mapped onto the effective data carried in the end symbol:

$$U=(L-Q) \bmod V \qquad (3)$$

Then, after determining the equivalent quantity of complex numbers mapped onto the effective data carried in the end symbol, the first device determines, according to the formula (2), the subcarrier spacing corresponding to the end symbol.

It should be noted that hybrid transmission of effective data and a DMRS signal means that some REs corresponding to one symbol carry the effective data and some REs corresponding to the symbol carry the DMRS signal. For example, FIG. 6A, FIG. 6B, FIG. 6C, FIG. 6D and FIG. 6E are a schematic diagram of a third symbol according to an embodiment of this application. As shown in FIG. 6A, FIG. 6B, FIG. 6C, FIG. 6D and FIG. 6E, it is assumed that one symbol is corresponding to 12 REs that are sequentially an RE 1 to an RE 12 from top to bottom. In FIG. 6A, an RE 1, an RE 3, an RE 5, an RE 7, an RE 9, and an RE 11 are used for transmitting data, and an RE 2, an RE 4, an RE 6, an RE 8, an RE 10, and an RE 12 are used for transmitting DMRS signals. In FIG. 6B, an RE 1, an RE 3, an RE 4, an RE 6, an RE 7, an RE 9, an RE 10, and an RE 12 are used for transmitting data, and an RE 2, an RE 4, an RE 8, and an RE 11 are used for transmitting DMRS signals. In FIG. 6C, an RE 1, an RE 2, an RE 4, an RE 5, an RE 6, an RE 8, an RE 9, an RE 10, and an RE 12 are used for transmitting data, and an RE 3, an RE 7, and an RE 11 are used for transmitting DMRS signals. In FIG. 6D, an RE 1, an RE 2, an RE 3, an RE 5, an RE 6, an RE 7, an RE 8, an RE 10, an RE 11, and an RE 12 are used for transmitting data, and an RE 4 and an RE 9 are used for transmitting DMRS signals. In FIG. 6E, an RE 1, an RE 4, an RE 5, an RE 8, an RE 9, and an RE 12 are used for transmitting data, and an RE 2, an RE 3, an RE 6, an RE 7, an RE 10, and an RE 11 are used for transmitting data.

During data transmission, a symbol that is used for hybrid transmission and that is in the transmission resource may usually be used for hybrid transmission of effective data and a DMRS signal in any one of manners in FIG. 6A, FIG. 6B, FIG. 6C, FIG. 6D and FIG. 6E. This is not specifically limited to this embodiment of this application.

It should be noted that in at least this embodiment of this application, that one symbol is corresponding to 12 REs is merely used as an example for description. Certainly, one symbol may be alternatively corresponding to another quantity of REs. For example, one symbol is corresponding to 24

REs. A quantity of REs corresponding to a symbol is not specifically limited to this embodiment of this application.

When the transmission resource includes the third symbol, the quantity of complex numbers mapped onto the effective data that may be used for padding the end symbol can be determined according to the formula (3), so that a quantity of redundant complex numbers that need to be used for padding the end symbol can be determined. When the quantity of redundant complex numbers that need to be used for padding the end symbol is greater than or equal to half the quantity of REs corresponding to the first symbol, it may be determined that the end symbol is the one or more specific symbols, and the subcarrier spacing corresponding to the end symbol in the transmission resource is determined based on the quantity of complex numbers mapped onto the effective data that may be used for padding the end symbol and the quantity of subcarriers corresponding to the first symbol, so as to compress the end symbol in time domain.

(3) In a multiple-input multiple-output (multiple-input multiple-output, MIMO) system, subcarrier spacings in a stream at each layer are the same. Therefore, a quantity U of complex numbers mapped onto effective data that may be used for padding an end symbol in the stream at each layer can be determined according to the formula (1) or the formula (3). In this way, a subcarrier spacing corresponding to the end symbol in the stream at each layer can be determined according to the formula (2), and then a subcarrier spacing in a stream at each layer in the MIMO system can be determined based on the subcarrier spacings in the stream at each layer according to a formula (4):

$$N_2 \in N_{2,1} \cap N_{2,2} \cap N_{2,3} \cap \ldots \quad (4)$$

$N_{2,1}$ represents a subcarrier spacing set corresponding to an end symbol in a stream at a first layer, $N_{2,2}$ represents a subcarrier spacing set corresponding to an end symbol in a stream at a second layer, and $N_{2,3}$ represents a subcarrier spacing set corresponding to an end symbol in a stream at a third layer.

2. The first device may determine the CP length of the one or more specific symbols in the following manner.

The numerology of the one or more specific symbols includes the cyclic prefix CP length, and the CP length $T_1$ of the one or more specific symbols is determined by the first device according to a formula (5):

$$T_1 = T \times \frac{N_1}{N_i} \quad (5)$$

T is the CP length of the first symbol, and $N_i$ is the subcarrier spacing corresponding to the one or more specific symbols.

When a CP type (an NCP/ECP) of a symbol in the transmission resource is determined, the CP length of the first symbol may usually be determined based on the CP type.

It should be noted that both a CP length of the end symbol and a CP length of the second symbol can be determined according to the formula (5).

According to the transmission control method provided in at least this embodiment of this application, the CP length of the one or more specific symbols can be determined according to the formula (5).

In some embodiments, when the compression indication sent by the first device carries a compression indication value, the first device and the second device each store a same correspondence between a compression indication value and a numerology of a one or more specific symbols.

After determining the transmission resource based on the to-be-transmitted data, the first device sends, to the second device, the compression indication value corresponding to the subcarrier spacing corresponding to the current one or more specific symbols. After receiving the compression indication, the second device determines, based on the compression indication value, the subcarrier spacing corresponding to the one or more specific symbols in the transmission resource.

For example, it is assumed that the compression indication is binary, and a quantity of symbols in the transmission resource is an integer multiple of a quantity of first symbols (namely, reference symbols). When the second symbol in the allocated transmission resource includes K symbols for transmitting DMRSs, a maximum of K symbols whose lengths each are equal to the length of the first symbol can be reduced through compression of the end symbol. When K is greater than 1, a length of the compression indication is greater than one bit.

It should be noted that, after determining the numerology of the first symbol and the subcarrier spacing corresponding to the one or more specific symbols, the first device may determine a time domain length of the one or more specific symbols based on a relationship between a frequency domain and a time domain, so as to determine total duration occupied by symbols in the allocated transmission resource.

For example, the second symbol in the transmission resource includes only one symbol denoted as a DMRS symbol 1, and a subcarrier spacing used for each first symbol is $N_1$. A base station determines that the DMRS symbol 1 can be compressed to at least half duration of the first symbol in time domain, and that the end symbol can also be compressed to at least half the duration of the first symbol in time domain. In other words, a subcarrier spacing greater than or equal to $N_1$ can be used for both the end symbol and the DMRS symbol 1.

It is assumed that the first device and the second device preconfigure a compression indication comparison table, as listed in Table 1. When the compression indication sent by the first device carries a compression indication value 0, it indicates that neither the end symbol nor the DMRS symbol 1 is compressed. When the compression indication carries a compression indication value 1, it indicates that a time domain length of the end symbol is compressed to ½ of that of the first symbol, and that a time domain length of the DMRS symbol 1 is also compressed to ½ of that of the first symbol. In other words, both the subcarrier spacing corresponding to the end symbol and a subcarrier spacing corresponding to the DMRS symbol 1 are double the subcarrier spacing corresponding to the first symbol.

TABLE 1

| Compression indication | Length of an end symbol | Length of a DMRS symbol 1 |
|---|---|---|
| 0 | 1 | 1 |
| 1 | ½ | ½ |

It should be noted that, for ease of description, in at least this embodiment of this application, an example is used for description in which a quantity of symbols in the transmission resource that are obtained after the compression is an integer quantity of first symbols. In at least this embodiment of this application, the quantity of symbols in the transmission resource that are obtained after the compression may alternatively be a fraction quantity of symbols. For example, 0.5 symbol or 0.25 symbol is obtained after the compression, and there may be 2.5 symbols or 2.25 symbols in the allocated transmission resource. This is not specifically limited to this embodiment of this application.

It is assumed that the second symbol in the transmission resource includes two symbols: a DMRS symbol 1 and a DMRS symbol 2. A 3-bit compression indication is required to indicate different compression cases. As listed in Table 2, seven compression manners are included. A compression indication value 000 indicates that neither the end symbol nor the DMRS symbols are compressed, so that a symbol length is not shortened relative to the length of the first symbol in time domain. A compression indication value 001 indicates that the end symbol is not compressed, and both the DMRS symbol 2 and the DMRS symbol 1 are compressed to ½ of the length of the first symbol, so that a symbol length is shortened by a length of one first symbol in time domain. A Compression Indication Value 010 Indicates that the End Symbol is Compressed to ½ of the Length of the first symbol, the DMRS symbol 2 is not compressed, and the DMRS symbol 1 is compressed to ½ of the length of the first symbol, so that a symbol length is shortened by a length of one first symbol in time domain. A compression indication value 011 indicates that both the end symbol and the DMRS symbol 2 are compressed to ½ of the length of the first symbol, and the DMRS symbol 1 is not compressed, so that a symbol length is shortened by a length of one first symbol in time domain. A compression indication value 100 indicates that the end symbol is compressed to ½ of the length of the first symbol, and both the DMRS symbol 2 and the DMRS symbol 2 are compressed to ¼ of the length of the first symbol, so that a symbol length is shortened by a length of two first symbols in time domain. A compression indication value 101 indicates that the end symbol is compressed to ¼ of the length of the first symbol, the DMRS symbol 2 is compressed to ½ of the length of the first symbol, and the DMRS symbol 2 is compressed to ¼ of the length of the first symbol, so that a symbol length is shortened by a length of two first symbols in time domain. A compression indication value 110 indicates that both the end symbol and the DMRS symbol 2 are compressed to ¼ of the length of the first symbol, and the DMRS symbol 2 is compressed to ½ of the length of the first symbol, so that a symbol length is shortened by a length of two first symbols in time domain. A compression indication value 111 may be reserved in another case.

TABLE 2

| Compression indication | Length of an end symbol | Length of a DMRS symbol 2 | Length of a DMRS symbol 1 | Symbol length for shortening |
|---|---|---|---|---|
| 000 | 1 | 1 | 1 | 0 |
| 001 | 1 | ½ | ½ | 1 |
| 010 | ½ | 1 | ½ | 1 |
| 011 | ½ | ½ | 1 | 1 |
| 100 | ½ | ¼ | ¼ | 2 |
| 101 | ¼ | ½ | ¼ | 2 |
| 110 | ¼ | ¼ | ½ | 2 |
| 111 | — | — | — | Reserved value |

It should be noted that in at least this embodiment of this application, that a time domain length for the compression is ½$^n$ of the length of the first symbol is merely used as an example for description, where n is a positive integer. Alternatively, another value may be used for the compression. This is not specifically limited to this embodiment of this application.

It should be noted that in at least this embodiment of this application, Table 1 and Table 2 are merely used as an example for description. In actual application, a combination in another form may be used. This is not specifically limited to this embodiment of this application.

In some embodiments, the first device adds the resource indication information, the compression indication, and the first indication to a same message or different messages, and sends the same message or the different messages to the second device.

By adding the resource indication information, the compression indication, and the first indication to the same message or the different messages and then sending the same message or the different messages to the second device, the first device can flexibly select a manner for notifying the second device, so that the second device can receive the resource indication information, the compression indication, and the first indication from the same message or the different messages.

In some embodiments, the first indication may be carried in downlink control information (downlink control information, DCI), a media access control element (MAC Control Element, MAC CE), a master information block (master information block, MIB), a system information block (system information block, SIB), a broadcast message, radio resource control (radio resource control, RRC) signaling, group common downlink control information (group common DCI), or a physical header of a transmission frame.

According to a transmission resource control method provided in at least this embodiment of this application, the first indication may be carried in a message or signaling that is flexibly selected depending on an actual use scenario.

In some embodiments, when the one or more specific symbols includes only the end symbol, or the one or more specific symbols includes the end symbol and the second symbol, the compression indication is carried in DCI or a physical header of a transmission frame.

According to the transmission resource control method provided in at least this embodiment of this application, the compression indication may be carried in a carrier that is flexibly selected depending on an actual use scenario.

In some embodiments, when the one or more specific symbols includes only the second symbol, the compression indication may be carried in DCI, a MAC CE, a MIB, a SIB, a broadcast message, RRC signaling, group common DCI, or a physical header of a transmission frame.

For example, when the compression indication and the first indication are carried in different messages, the compression indication and the first indication may be separately sent according to the following combinations. For example, when the first indication is carried in a system message (for example, a SIB/MIB), a MAC CE, a broadcast message, or RRC signaling, the compression indication may be carried in physical layer signaling (for example, carried in DCI on a physical downlink control channel (physical downlink control channel, PCDDH)). Alternatively, when the first indication is carried in group common group common DCI, the compression indication may be carried in DCI. It should be noted that the DCI carrying the compression indication is DCI for each UE. Certainly, the compression indication and the first indication may be carried in a same message. For example, both the compression indication and the first indication are carried in DCI.

When the one or more specific symbols in the transmission resource is the end symbol, the first device compresses only the end symbol. FIG. 7A, FIG. 7B and FIG. 7C are a schematic diagram for compressing a one or more specific symbols according to an embodiment of this application. FIG. 7A shows three first type of symbols (namely, reference symbols) determined by the first device based on the data volume of the to-be-transmitted data. The three first type of symbols are denoted as a symbol 1, a symbol 2, and a symbol 3. The symbol 1, the symbol 2, and the symbol 3 each are corresponding to 12 subcarriers, and subcarrier spacings each are $N_1=15$ kHz. After the first device determines that the one or more specific symbols is only the symbol 3 (the end symbol), assuming that the first device determines a subcarrier spacing corresponding to the symbol 3 is double $N_1$, the first device may determine that transmission duration of the symbol 3 in time domain is ½ of the duration of the first type of symbol, and the first device allocates a transmission resource shown in FIG. 7B. The transmission resource includes three symbols: a symbol 1, a symbol 2, and a symbol 4 (the end symbol). The symbol 1 and the symbol 2 are first type of symbols. Transmission duration of the symbol 4 in time domain is ½ of the transmission duration of the first type of symbol. The symbol 4 is corresponding to six subcarriers in frequency domain, and a subcarrier spacing corresponding to the symbol 4 is double the subcarrier spacing corresponding to the first type of symbol. FIG. 7C shows a first indication and a compression indication that are determined by the first device. The first indication is used to indicate numerologies of the first type of symbols (including the symbol 1 and the symbol 2), and the compression indication is used to indicate a numerology of the end symbol (the symbol 4). The first indication and the compression indication may be carried in a same downlink message or different downlink messages.

It should be noted that the first symbol in at least this embodiment of this application is merely an example for description. In actual application, the numerology of the first symbol may alternatively be another value. A specific value of the numerology of the first symbol is not specifically limited to this embodiment of this application.

Figure 8A:
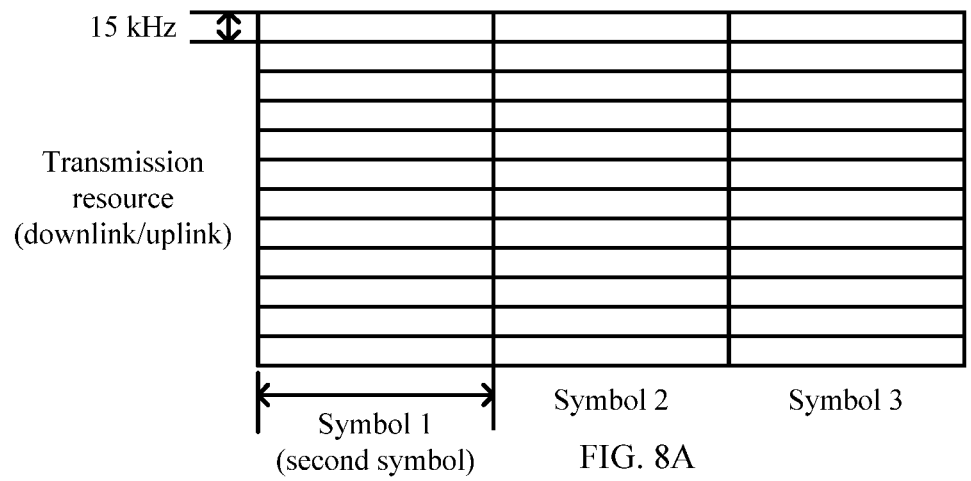
FIG. 8A, FIG. 8B and FIG. 8C are a schematic diagram for compressing another specific symbol according to at least an embodiment of this application.
Figure 8B:
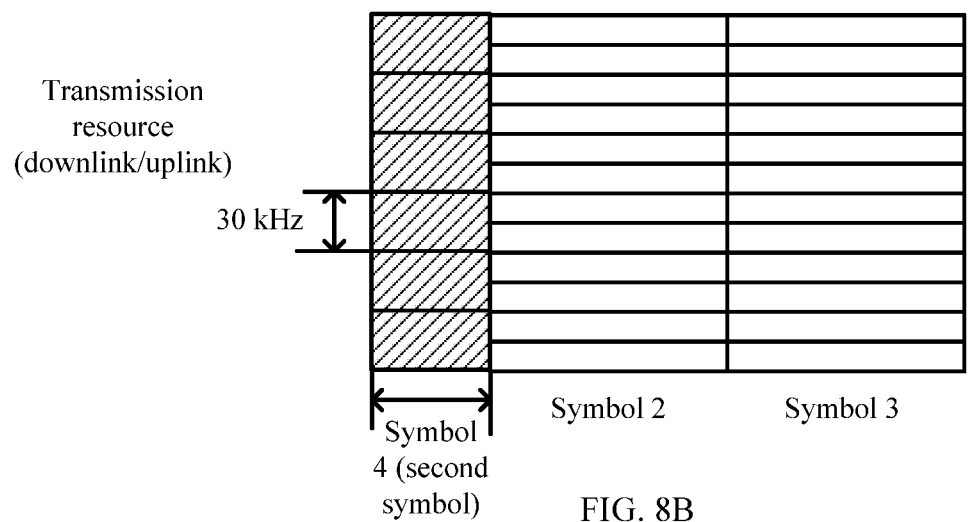
Figure 8C:
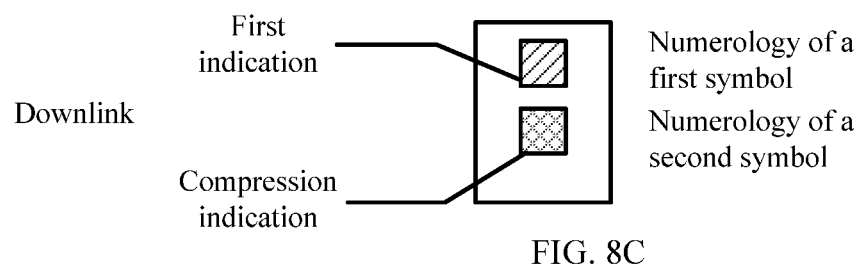

When the one or more specific symbols in the transmission resource includes only the second type of symbol, the first device compresses only the second type of symbol. FIG. 8A, FIG. 8B and FIG. 8C are a schematic diagram for compressing a one or more specific symbols according to an embodiment of this application. As shown in FIG. 8A, FIG. 8B and FIG. 8C, FIG. 8A shows three first type of symbols determined by the first device based on data volume of the to-be-transmitted data. The three first type of symbols are a symbol 1, a symbol 2, and a symbol 3. The symbol 1, the symbol 2, and the symbol 3 each are corresponding to 12 subcarriers, and a subcarrier spacing corresponding to each symbol is N1=15 kHz. Assuming that the first device determines that the symbol 1 is the second type of symbol and determines that the symbol 3 (the end symbol) does not need to be compressed, the first device determines that the symbol 1 is the one or more specific symbols. When the first device determines that a subcarrier spacing corresponding to the symbol 1 is double N1, the first device determines that transmission duration of the symbol 1 in time domain is changed to ½ of the duration of the first type of symbol. The first device allocates a transmission resource shown in FIG. 8B. The transmission resource includes three symbols: a symbol 4, a symbol 2, and a symbol 3. Transmission duration of the symbol 4 in time domain is ½ of the transmission duration of the first type of symbol. The symbol 4 is corresponding to six subcarriers in frequency domain, and a subcarrier spacing corresponding to the symbol 4 is double the subcarrier spacing corresponding to the first type of symbol. FIG. 8C shows a first indication and a compression indication that are determined by the first device. The first indication is used to indicate numerologies of the first type of symbols (including the symbol 2 and the symbol 3), and the compression indication is used to indicate a numerology of the second type of symbol (including the symbol 4). The first indication and the compression indication may be carried in a same downlink message or different downlink messages.

Figure 9A:
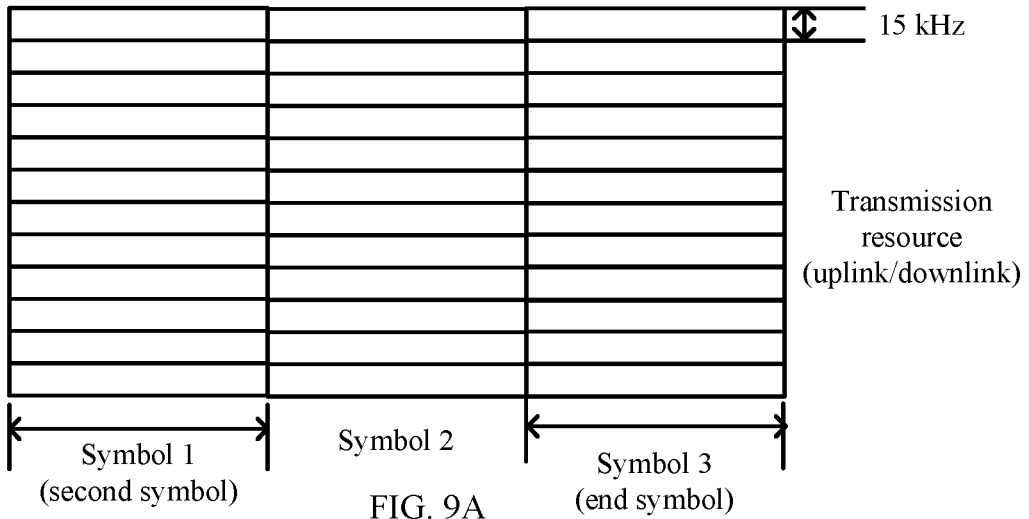
FIG. 9A, FIG. 9B and FIG. 9C are a schematic diagram for compressing another specific symbol according to at least an embodiment of this application.
Figure 9B:
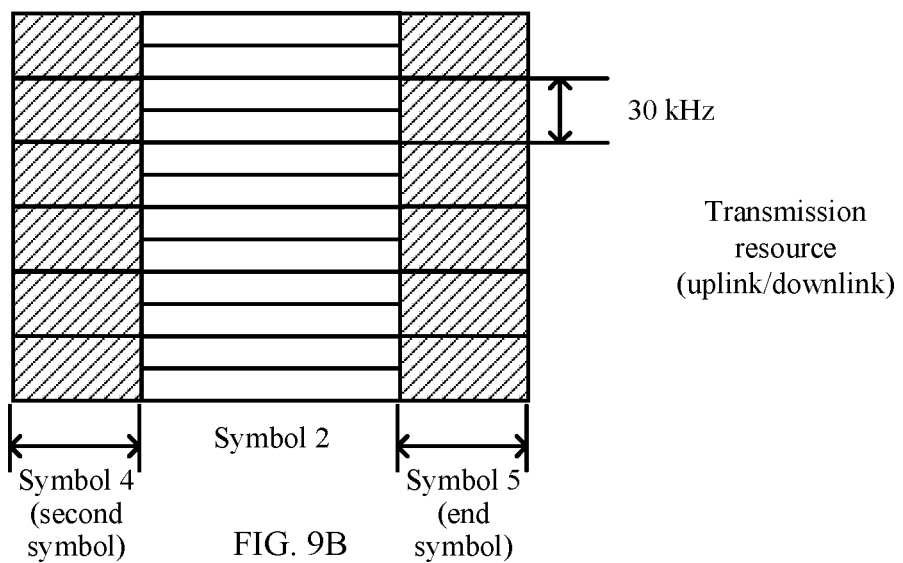
Figure 9C:
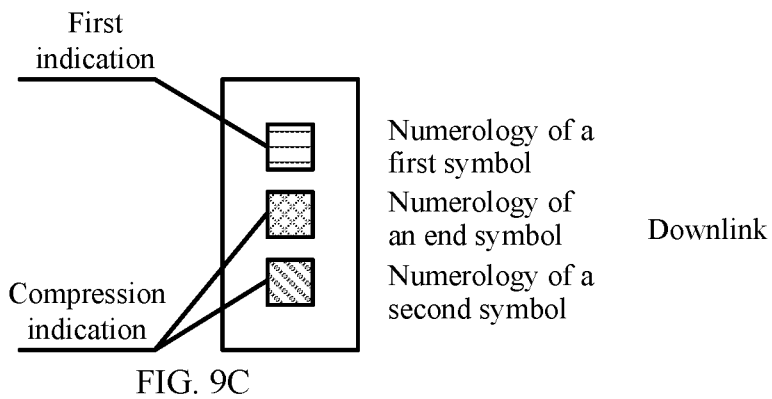

When the one or more specific symbols in the transmission resource includes the second type of symbol and the end symbol, FIG. 9A, FIG. 9B and FIG. 9C are a schematic diagram for compressing a one or more specific symbols according to an embodiment of this application. As shown in FIG. 9A, FIG. 9B and FIG. 9C, FIG. 9A shows three first type of symbols (namely, reference symbols) determined by the first device based on the data volume of the to-be-transmitted data. The three first type of symbols are denoted as a symbol 1, a symbol 2, and a symbol 3. The symbol 1, the symbol 2, and the symbol 3 each are corresponding to 12 subcarriers, and subcarrier spacings each are N1=15 kHz. Assuming that the first device determines that the symbol 1 is the second type of symbol and determines that the symbol 3 (the end symbol) needs to be compressed, the first device determines that the symbol 1 and the symbol 3 are the one or more specific symbols. When the first device determines that a subcarrier spacing corresponding to the symbol 1 is double N1 and a subcarrier spacing corresponding to the symbol 3 is double N1, the first device determines that both transmission duration of the symbol 1 and transmission duration of the symbol 3 in time domain are changed to ½ of the duration of the first type of symbol. The first device allocates a transmission resource shown in FIG. 9B. The transmission resource includes three symbols: a symbol 4 (the second type of symbol), a symbol 2 (the first type of symbol), and a symbol 5 (the end symbol). Both transmission duration of the symbol 2 and transmission duration of the symbol 5 in time domain are ½ of the transmission duration of the first type of symbol. The symbol 2 and the symbol 5 each are corresponding to six subcarriers in frequency domain, and a subcarrier spacing corresponding to the symbol 2 and the symbol 5 are double the subcarrier spacing corresponding to the first type of symbol. FIG. 9C shows a first indication and a compression indication that are determined by the first device. The first indication is used to indicate a numerology of the first type of symbol (including the symbol 2), and the compression indication is used to indicate numerologies of the second type of symbols (including the symbol 4 and the symbol 5). The first indication and the compression indication may be carried in a same downlink message or different downlink messages. The numerologies of the symbol 4 and the symbol 5 in the compression indication may also be carried in different downlink messages.

Figure 10A:
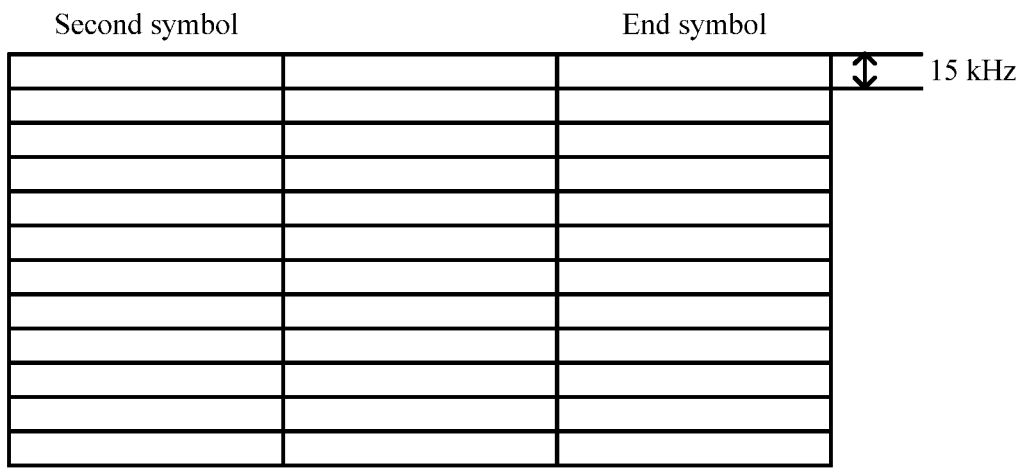
FIG. 10A and FIG. 10B are a schematic diagram for compressing another specific symbol according to at least an embodiment of this application.
Figure 10B:
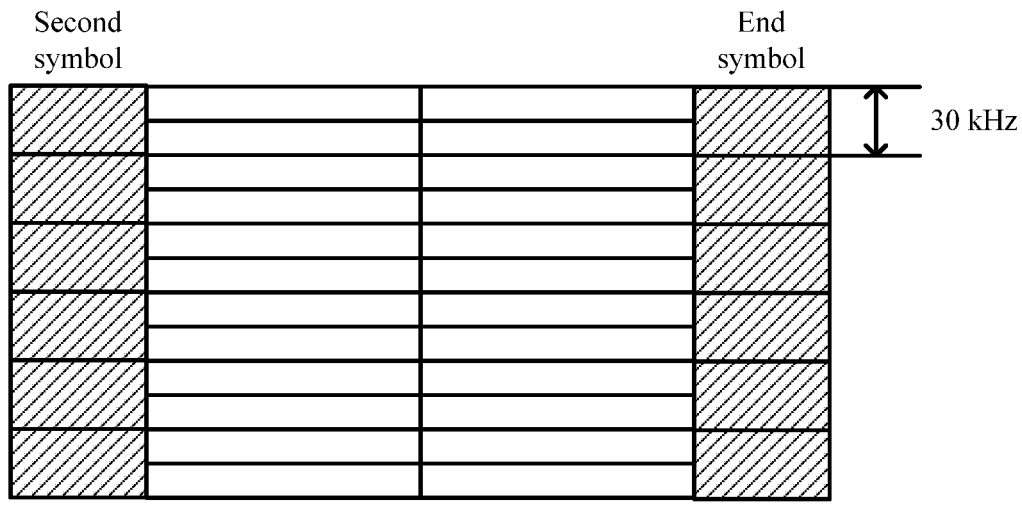

FIG. 10A and FIG. 10B are a schematic diagram for compressing a one or more specific symbols according to an embodiment of this application. As shown in FIG. 10A, the transmission resource includes three symbols, and the transmission resource includes a one or more specific symbols on which transmission control needs to be performed. When duration of the symbols remains unchanged, a transmission resource shown in FIG. 10B is obtained. In comparison with the transmission resource in FIG. 10A, in the transmission resource, duration of a symbol for transmitting effective data becomes longer in time domain, thereby improving utilization of the transmission resource.

Figure 11:
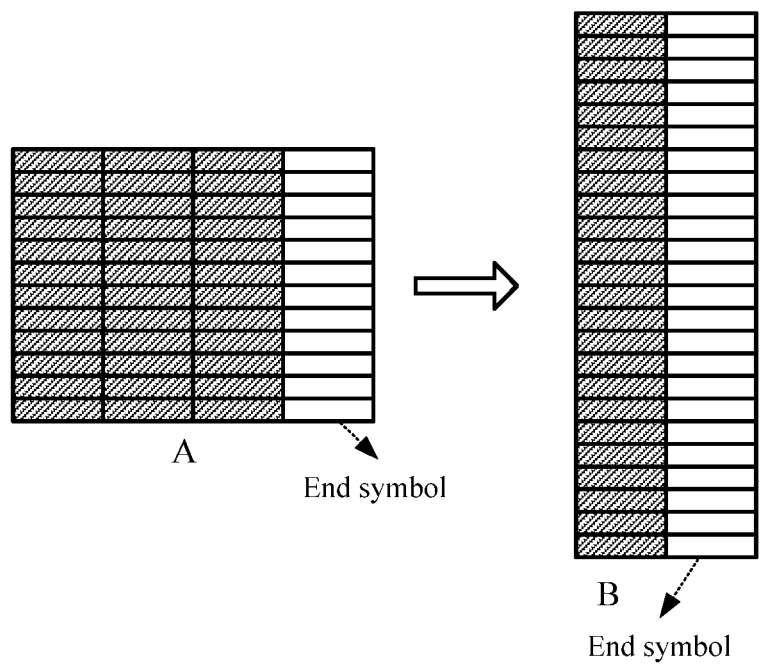
FIG. 11 is a schematic diagram of a transmission resource according to at least an embodiment of this application.

NR usually includes a URLLC service. To reduce transmission latency, URLLC data transmission needs to be completed in a time as short as possible. For a same data volume, shorter transmission time results in higher frequency domain resource bandwidth that is required. Consequently, each symbol is corresponding to more REs. FIG. 11 is a schematic diagram of a transmission resource according to an embodiment of this application. As shown in FIG. 11A, four symbols are included, each symbol is corresponding to 12 REs, and 11 REs need to be padded in a worst case. Assuming that in the URLLC service, transmission needs to be completed in a time as short as possible, a transmission resource shown in 11B of FIG. 11 may be used. The transmission resource includes two symbols, and each symbol is corresponding to 24 REs. To ensure that all allocated physical layer symbols are fully padded with MAC data, an end symbol in 11B of FIG. 11 may need to be padded with more redundant data, that is, a padding part is longer. Although transmission latency is shorter than that in 11A of FIG. 11, once padding needs to be performed, 23 REs need to be padded in a worst case. A proportion of padding redundancy in transmitted data is relatively large, causing a severer resource waste. Therefore, in the URLLC service, the end symbol can be compressed by using the transmission control method provided in at least this embodiment of this application, so that redundant data used for padding can be reduced, thereby improving utilization of the transmission resource.

In some embodiments, after step S104, the method further includes steps S105 and S106 or steps 105a and 106b S105. The first device sends data to the second device on the transmission resource.

The numerology indicated by the compression indication is used for the one or more specific symbols in the transmission resource, and the numerology indicated by the first indication is used for the symbol in the transmission resource other than the one or more specific symbols.

S106. The second device receives the data from the first device on the transmission resource.

Alternatively, S105a and S106a are performed as follows:

S105a. The first device receives data from the second device on the transmission resource.

S106a. The second device sends the data to the first device on the transmission resource.

According to the transmission control method provided in at least this embodiment of this application, data can be transmitted on the transmission resource, and the transmission resource includes symbols obtained after the one or more specific symbols is compressed. This avoids increasing excessive redundant data or transmitting excessive ineffective data during data transmission, thereby reducing transmission overheads.

It should be noted that the transmission control method in at least this embodiment of this application may be applicable to various OFDM-based communications systems, including a mobile communications system and a wireless local area network (wireless local area networks, WLAN) system. The WLAN system is a system based on the standard protocol 802.11. In the WLAN system, a radio frequency (radio frequency, RF) technology is used, and a communication connection is performed through an electromagnetic wave. In the WLAN system, two devices in communication can implement functions of the first device and the second device. For example, during communication between UE and an AP, when the UE sends data to the AP, the UE is the first device, and the AP is the second device; and when the AP sends data to the UE, the UE is the second device, and the AP is the first device. This is not specifically limited to this embodiment of this application.

It should be noted that in the WLAN system, the transmission control method in at least this embodiment of this application may also be used to perform transmission control on a symbol that is for transmitting a long training field (long training field, LTF) and that is in a physical header of a transmission frame and/or an end symbol in a data field of the transmission frame.

In some embodiments, the long training field may include high throughput-long term evolution (high throughput-long term evolution, HT-LTE) in 802.11n, a very high throughput-long training field (very high throughput-LTF, VHT-LTF) in 802.11ac, and a high throughput-long training field (high throughput-LTF, HE-LTF) in 802.11ax. These fields have a function similar to that of a DMRS in the mobile communications system, and are used for channel estimation. Compressing processing can be performed on symbols in the fields by using the transmission control method in at least this embodiment of this application.

For a method for determining a numerology of the end symbol in the data field, refer to the method for determining the numerology of the end symbol in the transmission resource. First, a quantity of values of effective complex numbers used for padding the end symbol in the data field is determined. The quantity of values of the effective complex numbers used for padding the end symbol in the data field is U that is determined according to the formula (1) or (3). Then, a subcarrier spacing corresponding to the end symbol in the data field is determined based on the quantity of values of the complex numbers used for padding the end symbol in the data field. In other words, N2 is determined according to the formula (2). For a method for determining a subcarrier spacing corresponding to the symbol for transmitting the long training field, refer to the method for determining the subcarrier spacing corresponding to the second symbol in the foregoing embodiment. Details are not described herein again.

In some embodiments, the first indication may be carried in a signal (signal, SIG) field. When the first indication is predefined, the second device can determine the numerology of the first symbol without the first indication. The first device generates the compression indication, adds the compression indication to the physical header of the transmission frame, and then transmits the physical header of the transmission frame to the second device. For example, the first device adds the compression indication to the SIG in the physical header. When a subcarrier spacing corresponding to a symbol in the data field other than the end symbol is a subcarrier spacing corresponding to a reference symbol, and a CP length is variable, the first indication may still be carried in the SIG field.

Figure 12:
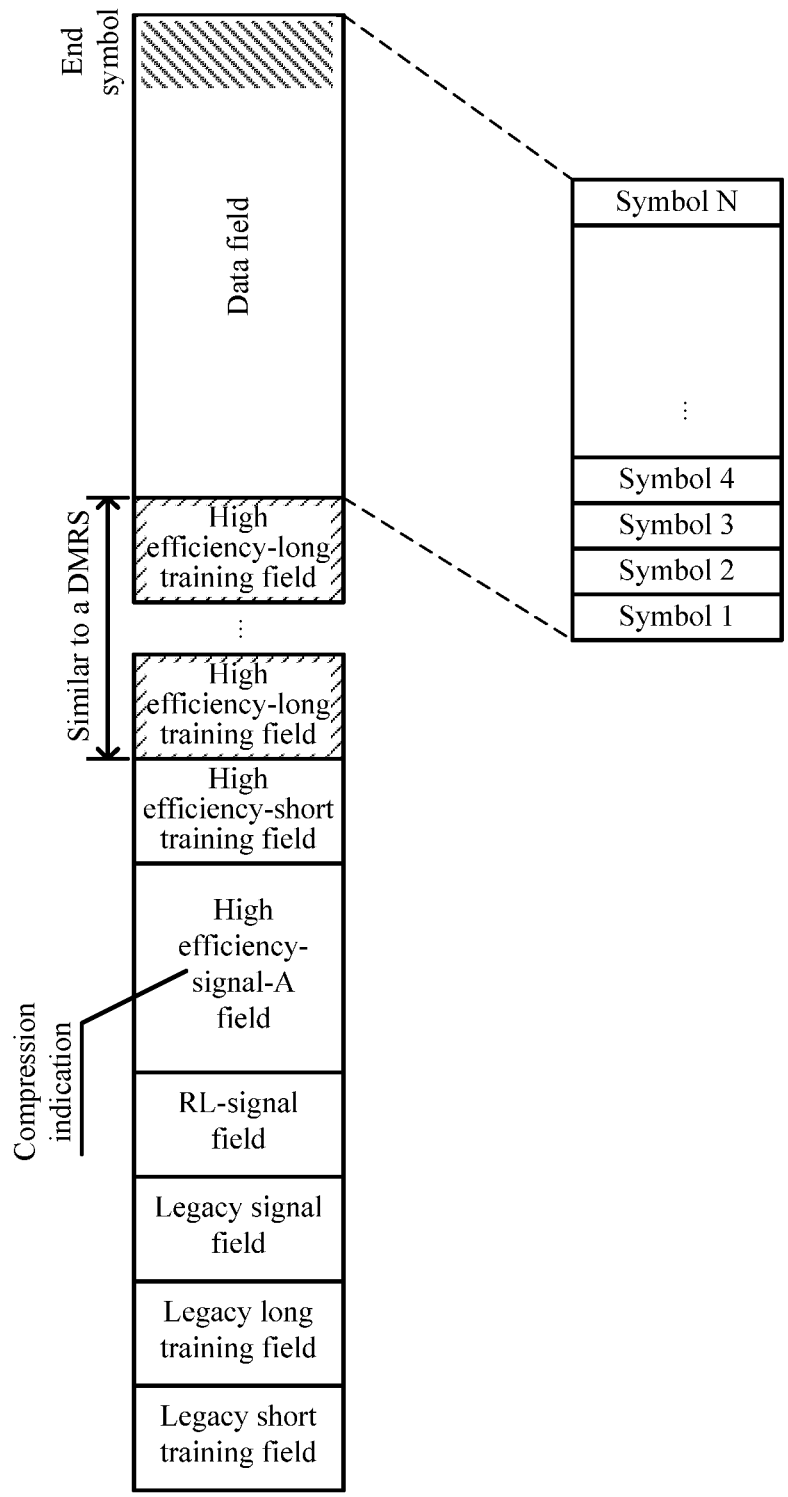
FIG. 12 is a schematic diagram of an 802.11ax frame format according to at least an embodiment of this application.

For example, both the compression indication and the first indication in at least this embodiment of this application may be carried in an 802.11ax frame structure. FIG. 12 shows an 802.11ax frame format according to an embodiment of this application. The frame format includes a legacy short training field (legacy-short training field, L-STF), a legacy long training field (legacy-long training field, L-LTF), a legacy signal (legacy-signal, L-SIG) field, an RL-signal (RL-signal, RL-SIG) field, a high efficiency-signal-A (high efficiency-signal-A, HE-SIG-A) field, a high efficiency-short training field (high efficiency-short training field, HE-STF), a high efficiency-long training field (high efficiency-long training field, HE-LTF), and a data field. A part other than the data field may be collectively referred to as a physical header part. The data field includes N symbols, where N is a positive integer. The end symbol in at least this embodiment of this application may also include the end symbol in the data field. The compression indication and the first indication may be carried in the HE-SIG-A field in the physical header of the transmission frame. For example, the compression indication may indicate a numerology of a symbol for transmitting the HE-LTF. This is not specifically limited to this embodiment of this application.

In a WLAN, a CP part and a data part of each symbol in the transmission frame are usually independent from each other, and the CP part does not affect duration of the data part. For example, in 802.11ax, the subcarrier spacing corresponding to the symbol in the data field other than the end symbol is usually a fixed value of 78.125 kHz, and a CP length in the data field may be 0.8 µs, 1.6 µs, or 3.2 µs. Correspondingly, according to the transmission control method provided in this application, the subcarrier spacing corresponding to the end symbol may be an integer multiple of the subcarrier spacing corresponding to the symbol in the data field other than the end symbol. For example, the subcarrier spacing corresponding to the end symbol may be any one of 78.125 kHz, 156.25 kHz, or 312.5 kHz, and the CP length of the end symbol may still be 0.8 µs, 1.6 µs, or 3.2 µs. The CP length of the end symbol in the data field is not specifically limited to this embodiment of this application.

It should be noted that in the WLAN system, when the one or more specific symbols includes only the symbol for transmitting the long training field, the compression indication is used to indicate a numerology of the symbol for transmitting the long training field; when the one or more specific symbols includes only the end symbol in the data field, the compression indication is used to indicate a numerology of the end symbol in the data field; or when the one or more specific symbols includes the symbol for transmitting the long training field and the end symbol in the data field, the compression indication is used to indicate the numerology of the symbol for transmitting the long training field and the numerology of the end symbol in the data field.

According to the transmission control method provided in at least this embodiment of this application, transmission overheads in the transmission frame can also be reduced in the WLAN system, thereby improving resource utilization.

It should be noted that the transmission control method provided in at least this embodiment of this application can be applied to uplink data transmission, downlink data transmission, and data transmission between D2D devices. This is not specifically limited to this embodiment of this application.

The foregoing describes, mainly from a perspective of devices, the solutions provided in this application. It can be understood that, to implement the foregoing functions, the foregoing terminals include corresponding hardware structures and/or software modules for performing the functions. A person skilled in the art should be easily aware that units and algorithms steps in the examples described in the embodiments disclosed in this specification may be implemented by using hardware or a combination of hardware and computer software in this application. Whether a function is performed by using hardware or computer software driving hardware depends on particular applications and design constraints of the technical solutions. A person skilled in the art may use a different method to implement the described functions for each particular application, but it should not be considered that the implementation goes beyond the scope of this application.

In the embodiments of this application, division of functional modules may be performed on the devices based on the foregoing method examples. For example, the functional modules may be obtained through division in correspondence to the functions, or at least two functions may be integrated into one processing module. The integrated module may be implemented in a form of hardware, or may be implemented in a form of a software functional module. It should be noted that module division in the embodiments of this application is an example, is merely logical function division, and may be other division in actual implementation.

Figure 13:
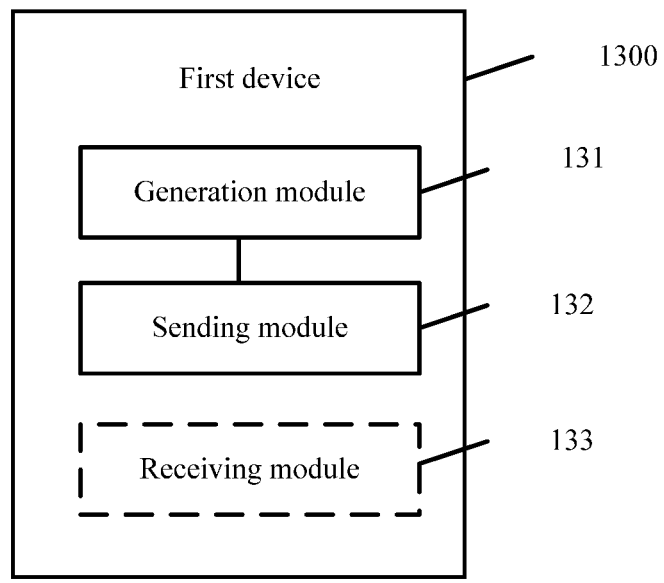
FIG. 13 is a schematic structural diagram of a first device according to at least an embodiment of this application.

For example, when the functional modules are obtained through division in correspondence to the functions, FIG. 13 is a possible schematic structural diagram of a first device 1300 related to the foregoing embodiment. As shown in FIG. 13, the first device 1300 includes a generation module 131 and a sending module 132. In some embodiments, the first device further includes a receiving module 133. The generation module 131 is configured to support the first device 1300 in performing steps S101, S101A, and S101B in the foregoing method embodiment. The sending module 132 is configured to support the first device 1300 in performing steps S102 and S105a in the foregoing method embodiment. The receiving module 133 is configured to support the first device 1300 in performing step S105 in the foregoing method embodiment. All related content of various steps in the foregoing method embodiment may be cited in function descriptions of a corresponding functional module. Details are not described herein again.

Figure 14:
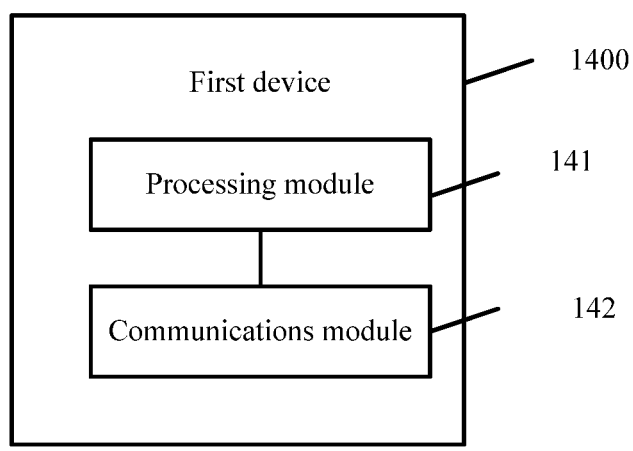
FIG. 14 is a schematic structural diagram of another first device according to at least an embodiment of this application.

When the functional modules are obtained through division in an integrated manner, FIG. 14 is a possible schematic structural diagram of a first device 1400 related to the foregoing embodiment. As shown in FIG. 14, the first device 1400 includes a processing module 141 and a communications module 142. The processing module 141 is configured to support the first device 1400 in performing steps S101, S101A, and S101B in the foregoing method embodiment. The communications module 142 is configured to support steps S102, S105, and S105a in the foregoing method embodiment. All related content of various steps in the foregoing method embodiment may be cited in function descriptions of a corresponding functional module. Details are not described herein again.

Figure 15:
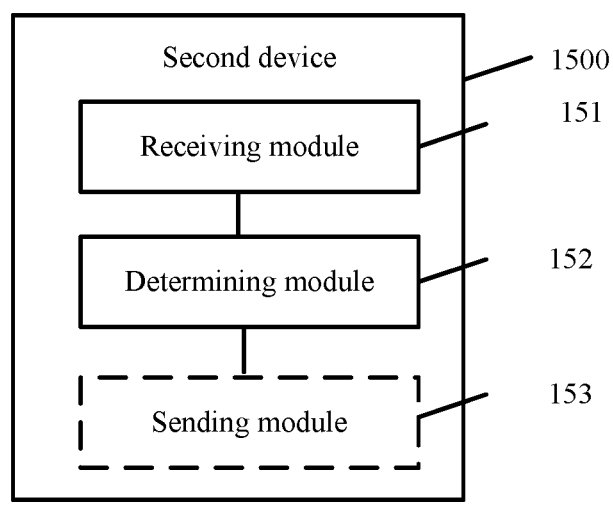
FIG. 15 is a schematic structural diagram of a second device according to at least an embodiment of this application.

For example, when the functional modules are obtained through division in correspondence to the functions, FIG. 15 is a possible schematic structural diagram of a second device 1500 related to the foregoing embodiment. As shown in FIG. 15, the second device 1500 includes a receiving module 151 and a determining module 152. In some embodiments, the second device further includes a sending module 153. The receiving module 151 is configured to support the second device 1500 in performing steps S103 and S106 in the foregoing method embodiment. The determining module 152 is configured to support the second device 1500 in performing step S104 in the foregoing method embodiment. The sending module 153 is configured to support the second device 1500 in performing step S106a in the foregoing method embodiment. All related content of various steps in the foregoing method embodiment may be cited in function descriptions of a corresponding functional module. Details are not described herein again.

Figure 16:
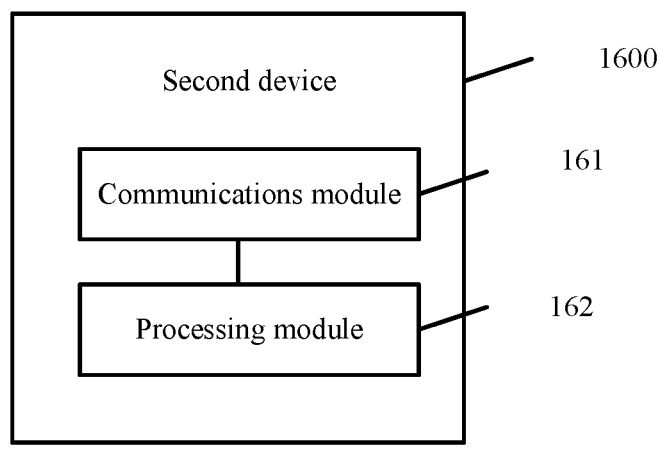
FIG. 16 is a schematic structural diagram of another second device according to at least an embodiment of this application.

When the functional modules are obtained through division in an integrated manner, FIG. 16 is a possible schematic structural diagram of a second device 1600 related to the foregoing embodiments. As shown in FIG. 16, the second device 1600 includes a processing module 161 and a communications module 162. The processing module 161 is configured to support the second device 1600 in performing step S104 in the foregoing method embodiment. The communications module 162 is configured to support the second device 1600 in performing steps S103, S106, and S106a in the foregoing method embodiment. All related content of various steps in the foregoing method embodiment may be cited in function descriptions of a corresponding functional module. Details are not described herein again.

Figure 17:
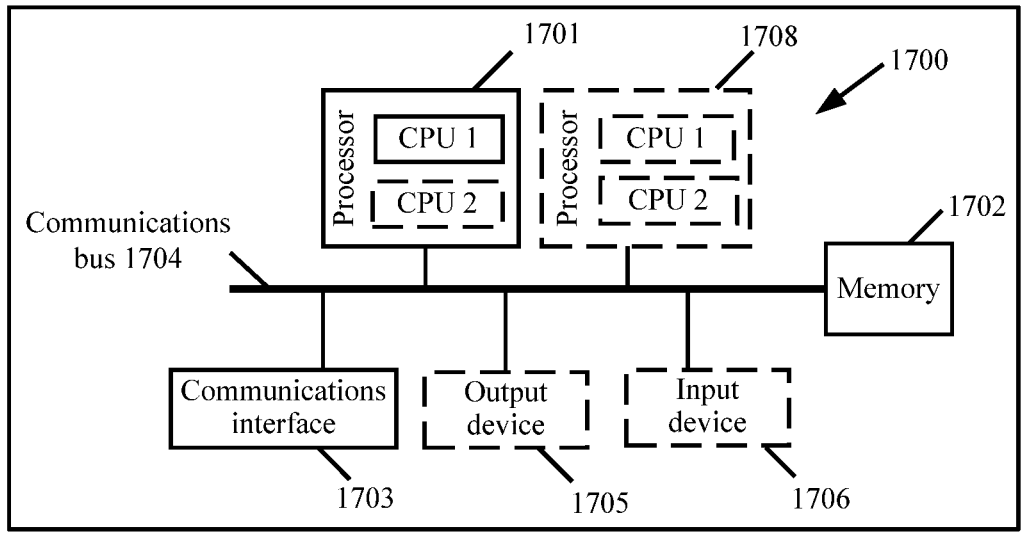
FIG. 17 is a schematic diagram of a hardware structure of a first device according to at least an embodiment of this application.

FIG. 17 is a schematic diagram of a hardware structure of a first device according to an embodiment of this application. The first device 1700 includes at least one processor 1701, a memory 1702, a communications interface 1703, and a communications bus 1704.

The processor 1701 may be a general-purpose central processing unit (English: central processing unit, CPU), a microprocessor, an application-specific integrated circuit (English: application-specific integrated circuit, ASIC), or one or more integrated circuits configured to control program execution in the solutions of this application.

When the first device is implemented by using the hardware structure in FIG. 17, the processor 1701 may be configured to support the first device in performing steps S101, S101A, and S101B in the foregoing method embodiment and/or other processes in technologies described in this application. In other words, the processor 1701 can complete all steps performed by the processing module 1401 shown in FIG. 14.

The communications bus 1704 may include a path for information transmission between the components. The communications bus 1704 may be a peripheral component interconnect (peripheral component interconnect, PCI) communications bus, an extended industry standard architecture (extended industry standard architecture, EISA) communications bus, or the like. The communications bus 1704 may be classified into an address bus, a data bus, a control bus, and the like. For ease of representation, the communications bus 1704 is represented by using only one bold line in FIG. 17. However, this does not mean that there is only one communications bus or only one type of communications bus.

The communications interface 1703 uses any apparatus such as a transceiver to communicate with another device or a communications network, for example, an Ethernet, a radio access network (English: radio access network, RAN), or a wireless local area network (English: wireless local area networks, WLAN).

When the first device is implemented by using the hardware structure in FIG. 17, the communications interface 1703 may be configured to support the first device in performing steps S102, S105, and S105a in the foregoing method embodiment and/or other processes in technologies described in this application. In other words, the communications interface 1704 can complete all steps performed by the communications module 1402 shown in FIG. 14.

The memory 1702 may be a read-only memory (English: read-only memory, ROM), another type of static storage device that is capable of storing static information and an instruction, a random access memory (English: random access memory, RAM), or another type of dynamic storage device that is capable of storing information and an instruction, or may be an electrically erasable programmable read-only memory (English: electrically erasable programmable read-only memory, EEPROM), a compact disc read-only memory (English: compact disc read-only memory, CD-ROM), other optical disk storages, optical disc storages (including a compact disc, a laser disc, an optical disc, a digital versatile disc, a Blu-ray disc, and the like), and magnetic disk storage mediums, another magnetic storage device, or any other medium that can be used to carry or store expected program code in a form of an instruction or a data structure and can be accessed by a computer. However, this is not limited thereto The memory may exist alone and is connected to the processor through the bus. Alternatively, the memory may be integrated with the processor.

The memory 1702 is configured to store application program code for performing the solutions of this application, and the processor 1701 controls execution. The processor 1701 is configured to execute the application program code stored in the memory 1702, to implement the transmission control method in the embodiments of this application.

During specific implementation, in an embodiment, the processor 1701 may include one or more CPUs, for example, a CPU 0 and a CPU 1 in FIG. 17.

During specific implementation, in an embodiment, the first device 1700 may include a plurality of processors, for example, the processor 1701 and a processor 1708 in FIG. 17. Each of these processors may be a single-core processor (English: single-CPU), or may be a multi-core processor (English: multi-CPU). The processor herein may be one or more devices, one or more circuits, and/or one or more processing cores configured to process data (for example, a computer program instruction).

During specific implementation, in an embodiment, the first device 1700 may further include an output device 1705 and an input device 1706. The output device 1705 communicates with the processor 1701, and may display information in a plurality of manners. For example, the output device 1705 may be a liquid crystal display (English: liquid crystal display, LCD), a light emitting diode (English: light emitting diode, LED) display device, a cathode ray tube (English: cathode ray tube, CRT) display device, or a projector (English: projector). The input device 1706 communicates with the processor 1701, and may receive user input in a plurality of manners. For example, the input device 1906 may be a mouse, a keyboard, a touchscreen device, or a sensing device.

The first device 1700 may be a general-purpose computer device or a dedicated computer device. During specific implementation, the first device 1700 may be a desktop computer, a portable computer, a network server, a personal digital assistant (English: personal digital assistant, PDA), a mobile phone, a tablet computer, a wireless terminal device, a communications device, an embedded device, or a device with a structure similar to that in FIG. 19. A type of the first device 1700 is not limited to this embodiment of this application.

Figure 18:
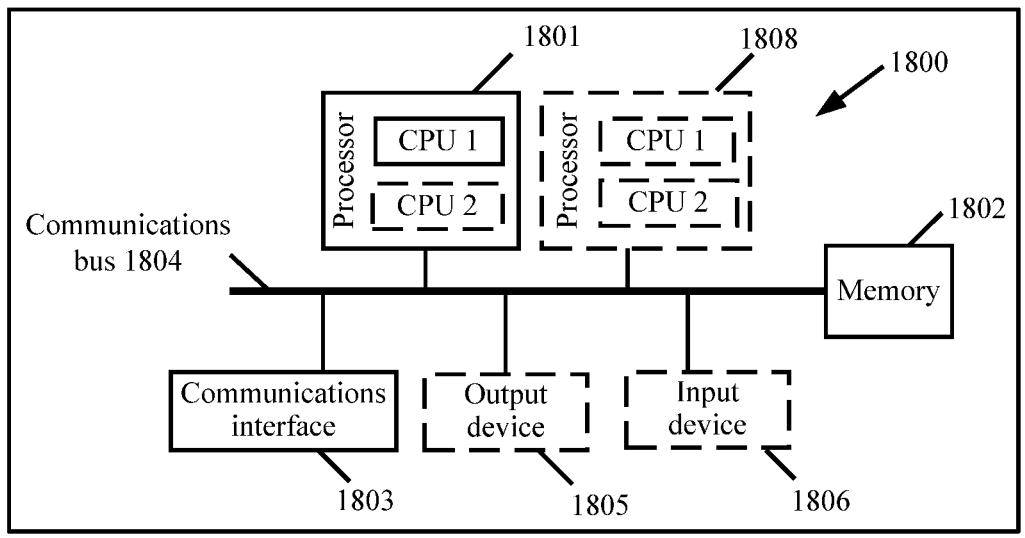
FIG. 18 is a schematic diagram of a hardware structure of a second device according to at least an embodiment of this application.

FIG. 18 is a schematic diagram of a hardware structure of a second device according to an embodiment of this application. The second device 1800 includes one or more processors 1801, a memory 1802, a communications interface 1803, and a bus 1804. For details about the one or more processors 1801, the memory 1802, the communications interface 1803, and the bus 1804, refer to the descriptions of the first device 1700. Details are not described herein again.

When the second device is implemented by using the hardware structure in FIG. 18, the processor 1801 may be configured to support the second device in performing step S104 in the foregoing method embodiment and/or other processes in technologies described in this application. In other words, the processor 1801 can complete all steps performed by the processing module 1602 shown in FIG. 16.

When the second device is implemented by using the hardware structure in FIG. 18, the communications interface 1803 may be configured to support the second device in performing steps S103, S106, and S106a in the foregoing method embodiment and/or other processes in technologies described in this application. In other words, the communications interface 1803 can complete all steps performed by the communications module 1602 shown in FIG. 16.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art can understand and implement other variations of the disclosed embodiments by viewing the accompanying drawings, disclosed content, and the appended claims. In the claims, "comprising" (comprising) does not exclude other components or other steps, and "a" or "one" does not exclude a case of "a plurality of". A single processor or another unit can implement several functions enumerated in the claims. Some measures are recorded in dependent claims that are different from each other, but this does not mean that these measures cannot be combined to achieve a desirable effect.

Although this application is described with reference to specific features and the embodiments thereof, apparently, various modifications and combinations can be made to them without departing from the spirit and scope of this application. Correspondingly, this specification and the accompanying drawings are merely example descriptions of this application defined by the appended claims, and are considered as covering any or all modifications, variations, combinations, or equivalents within the scope of this application. Apparently, a person skilled in the art can make various modifications and variations to this application without departing from the spirit and scope of this application. This application is intended to cover these modifications and variations of this application, provided that these modifications and variations fall within the scope defined in the claims of this application and equivalent technologies thereof.

What is claimed is:

1. A transmission control method, the method comprising:
generating, by a first device, transmission control information, wherein the transmission control information comprises resource indication information, a compression indication, and a first indication, the resource indication information indicates a transmission resource allocated by the first device to a second device, the transmission resource comprises at least two symbols, the compression indication indicates a numerology of one or more specific symbols in the transmission resource, the one or more specific symbols comprises at least an end symbol or a second type of symbol, the end symbol is the last symbol in the transmission resource, the second type of symbol is a symbol in the transmission resource usable for transmitting only a demodulation reference signal (DMRS) or a long training field, the second type of symbol comprises at least one symbol, and the first indication indicates a numerology of symbols in the transmission resource other than the one or more specific symbols; and sending, by the first device, the transmission control information to the second device;

wherein the compression indication indicates a numerology of the end symbol, and the numerology of the end symbol comprises a subcarrier spacing corresponding to the end symbol, and the subcarrier spacing corresponding to the end symbol is an integer multiple of a subcarrier spacing corresponding to a first type of symbol.

2. A first device comprising:
a processor; and
a transmitter;
wherein the processor is configured to:
generate transmission control information, wherein the transmission control information comprises resource indication information, a compression indication, and a first indication, the resource indication information indicates a transmission resource allocated by the first device to a second device, the transmission resource comprises at least two symbols, the compression indication indicates a numerology of one or more specific symbols in the transmission resource, the one or more specific symbols comprises at least an end symbol or a second type of symbol, the end symbol is the last symbol in the transmission resource, the second type of symbol is a symbol in the transmission resource useable for transmitting only a demodulation reference signal (DMRS) or a long training field, the second type of symbol comprises at least one symbol, and the first indication indicates a numerology of symbols in the transmission resource other than the one or more specific symbols; and wherein the transmitter is configured to:
send the transmission control information to the second device;

wherein the compression indication indicates a numerology of the end symbol, and the numerology of the end symbol comprises a subcarrier spacing corresponding to the end symbol, and the subcarrier spacing corresponding to the end symbol is an integer multiple of a subcarrier spacing corresponding to a first type of symbol.

3. The first device according to claim 2, wherein the first device further comprises a receiver;
wherein the transmitter is further configured to send data to the second device on the transmission resource; and
the receiver is configured to receive data from the second device on the transmission resource, wherein the numerology indicated by the compression indication corresponds to the one or more specific symbols in the transmission resource, and the numerology indicated by the first indication corresponds to the symbols in the transmission resource other than the one or more specific symbols.

4. The first device according to claim 2, wherein the one or more specific symbols includes only the end symbol, and the compression indication indicates a numerology of the end symbol.

5. The first device according to claim 2, wherein the one or more specific symbols includes only the second type of symbol, and the compression indication indicates a numerology of the second type of symbol.

6. The first device according to claim 2, wherein the one or more specific symbols comprises the end symbol and the second type of symbol, and the compression indication indicates a numerology of the end symbol and a numerology of the second type of symbol.

7. The first device according to claim 2, wherein
the compression indication indicates a numerology of the second type of symbol, and the numerology of the second type of symbol comprises a subcarrier spacing corresponding to the second type of symbol, the subcarrier spacing corresponding to the second type of symbol is an integer multiple of a subcarrier spacing corresponding to a first type of symbol, and the one or more first type of symbols are symbols that do not belong to the one or more specific symbols in the transmission resource.

8. The first device according to claim 2, wherein the subcarrier spacing corresponding to the end symbol is determined by the first device according to a formula U=L mod V, wherein
U represents a quantity of complex numbers mapped onto effective data for padding the end symbol, L represents a total quantity of complex numbers mapped onto the effective data, and V represents a quantity of subcarriers corresponding to the first type of symbol; and $$\begin{cases} N_1 = N_2 & \text{if } U = 0, \text{ or } \frac{V}{2} < U < V \\ N_2 \in \{N_1, 2N_1, 4N_1, \ldots, 2^n N_1\} & \text{if } \frac{V}{2^{n+1}} < U \leq \frac{V}{2^n} \end{cases},$$

where $N_1$ represents the subcarrier spacing corresponding to the first type of symbol, $N_2$ represents the subcarrier spacing corresponding to the end symbol, and n is a positive integer.

9. The first device according to claim 8, wherein
the subcarrier spacing corresponding to the end symbol is determined by the first device according to a formula U=(L−Q)mod V, and a third symbol is a symbol for hybrid transmission of effective data and a DMRS, or the third symbol is the symbol for hybrid transmission of the effective data and a long training field, in response to the transmission resource including the third symbol, wherein
U represents a quantity of complex numbers mapped onto the effective data for padding the end symbol, L represents a total quantity of complex numbers mapped onto the effective data, V represents a quantity of subcarriers corresponding to the first type of symbol, and Q represents a quantity of complex numbers manned onto the effective data in all the third symbols; and $$\begin{cases} N_2 = N_1 & \text{if } U = 0, \text{ or } \frac{V}{2} < U < V \\ N_2 \in \{N_1, 2N_1, 4N_1, \ldots, 2^n N_1\} & \text{if } \frac{V}{2^{n+1}} < U \leq \frac{V}{2^n} \end{cases},$$

wherein $N_1$ represents the subcarrier spacing corresponding to the first type of symbol, $N_2$ represents the subcarrier spacing corresponding to the end symbol, and n is a positive integer.

10. The first device according to claim 8, wherein
the numerology of the one or more specific symbols comprises a cyclic prefix (CP) length, the CP length $T_1$ of the one or more specific symbols is determined by the first device according to a formula $$T_1 = T \times \frac{N_1}{N_i},$$

where T is a CP length of the first type of symbol, and $N_i$ is a subcarrier spacing corresponding to the one or more specific symbols.

11. The first device according to claim 2, wherein the transmitter is further configured to:
add at least the resource indication information, the compression indication, or the first indication to a same message or different messages, and
send the same message or the different messages to the second device.

12. The first device according to claim 11, wherein
the first indication is carried in downlink control information (DCI), a media access control element (MAC CE), a master information block (MB), a system information block (SIB), a broadcast message, radio resource control (RRC) signaling, group common DCI, or a physical header of a transmission frame.

13. The first device according to claim 11, wherein
the compression indication is carried in downlink control information (DCI) or a physical header of a transmission frame in response to the one or more specific symbols including only the end symbol, or the one or more specific symbols including the end symbol and the second type of symbol; or
the compression indication is carried in the DCI, a media access control element (MAC CE), a master information block (MB), a system information block (SIB), radio resource control (RRC) signaling, group common DCI, or a physical header of a transmission frame in response to the one or more specific symbols including only the second type of symbol.

14. A second device comprising:
a receiver; and
a processor;

wherein the receiver is configured to:
receive transmission control information from a first device, wherein the transmission control information comprises resource indication information, a compression indication, and a first indication, the resource indication information indicates a transmission resource allocated by the first device to the second device, the transmission resource comprises at least two symbols, the compression indication indicates a numerology of one or more specific symbols in the transmission resource, the one or more specific symbols comprises at least an end symbol or a second type of symbol, the end symbol is the last symbol in the transmission resource, the second type of symbol is a symbol in the transmission resource useable for transmitting only a demodulation reference signal (DMRS) or a long training field, the second type of symbol comprises at least one symbol, and the first indication indicates a numerology of symbols in the transmission resource other than the one or more specific symbols; and wherein the processor is configured to:
determine the transmission resource based on the resource indication information,
determine the numerology of the one or more specific symbols in the transmission resource based on the compression indication, and
determine the numerology of the symbols in the transmission resource other than the one or more specific symbols based on the first indication; and the processor or the receiver includes one of the following configurations:
wherein the one or more specific symbols includes only the end symbol, and the compression indication indicates a numerology of the end symbol; or wherein the one or more specific symbols comprises the end symbol and the second type of symbol, and the compression indication indicates a numerology of the end symbol and a numerology of the second type of symbol.

15. The second device according to claim 14, wherein the second device further comprises a transmitter;
the transmitter is configured to send data to the first device on the transmission resource; and
the receiver is further configured to receive data from the first device on the transmission resource, wherein the numerology indicated by the compression indication correspond to the one or more specific symbols in the transmission resource, and the numerology indicated by the first indication corresponds to the symbols in the transmission resource other than the one or more specific symbols.

16. The second device according to claim 14, wherein the one or more specific symbols includes only the second type of symbol, and the compression indication indicates a numerology of the second type of symbol.

17. The second device according to claim 14, wherein the compression indication indicates a numerology of the second type of symbol, and the numerology of the second type of symbol comprises a subcarrier spacing corresponding to the second type of symbol, the subcarrier spacing corresponding to the second type of symbol is an integer multiple of a subcarrier spacing corresponding to a first type of symbol, and
the one or more first type of symbols are symbols that do not belong to the one or more specific symbols in the transmission resource.

* * * * *

UNITED STATES PATENT AND TRADEMARK OFFICE
CERTIFICATE OF CORRECTION

PATENT NO. : 11,240,798 B2
APPLICATION NO. : 16/629001
DATED : February 1, 2022
INVENTOR(S) : Zhenguo Du It is certified that error appears in the above-identified patent and that said Letters Patent is hereby corrected as shown below:

In the Claims

Column 32 Line 44 Claim 12 should read:
12. The first device according to claim 11, wherein
the first indication is carried in downlink control information (DCI), a media access control element (MAC CE), a master information block (MIB), a system information block (SIB), a broadcast message, radio resource control (RRC) signaling, group common DCI, or a physical header of a transmission frame.

Column 11 Line 51 Claim 13 should read:
13. The first device according to claim 11, wherein
the compression indication is carried in downlink control information (DCI) or a physical header of a transmission frame in response to the one or more specific symbols including only the end symbol, or the one or more specific symbols symbol including the end symbol and the second type of symbol; or
the compression indication is carried in the DCI, a media access control element (MAC CE), a master information block (MIB), a system information block (SIB), radio resource control (RRC) signaling, group common DCI, or a physical header of a transmission frame in response to the one or more specific symbols including only the second type of symbol.

Signed and Sealed this
Thirty-first Day of May, 2022

Katherine Kelly Vidal
*Director of the United States Patent and Trademark Office*